US010274259B2

(12) United States Patent
Palanchon et al.

(10) Patent No.: US 10,274,259 B2
(45) Date of Patent: Apr. 30, 2019

(54) MULTI-SIDED HEAT EXCHANGERS WITH COMPLIANT HEAT TRANSFER SURFACES

(71) Applicant: DANA CANADA CORPORATION, Oakville (CA)

(72) Inventors: Hervé Palanchon, Ulm (DE); Benjamin A. Kenney, Toronto (CA); Allan K. So, Mississauga (CA)

(73) Assignee: Dana Canada Corporation, Oakville, Ontario (CA)

(*) Notice: Subject to any disclaimer, the term of this patent is extended or adjusted under 35 U.S.C. 154(b) by 238 days.

(21) Appl. No.: 15/319,850

(22) PCT Filed: Jun. 26, 2015

(86) PCT No.: PCT/CA2015/050604
§ 371 (c)(1),
(2) Date: Dec. 19, 2016

(87) PCT Pub. No.: WO2015/196301
PCT Pub. Date: Dec. 30, 2015

(65) Prior Publication Data
US 2017/0176108 A1    Jun. 22, 2017

Related U.S. Application Data

(60) Provisional application No. 62/017,871, filed on Jun. 27, 2014.

(51) Int. Cl.
H01M 10/6556    (2014.01)
F28D 1/06    (2006.01)
(Continued)

(52) U.S. Cl.
CPC .............. F28D 1/06 (2013.01); F28F 3/042 (2013.01); F28F 3/044 (2013.01); F28F 3/12 (2013.01);
(Continued)

(58) Field of Classification Search
None
See application file for complete search history.

(56) References Cited

U.S. PATENT DOCUMENTS 3,814,172 A    6/1974    Shore
4,072,188 A    2/1978    Wilson et al.
(Continued)

FOREIGN PATENT DOCUMENTS

CN    1620588 A    5/2005
CN    100356130 C    12/2007
(Continued)

OTHER PUBLICATIONS

Canadian Intellectual Property Office, International Search Report and Written Opinion, Sep. 10, 2015, 8 pages, Canadian Intellectual Property Office, Gatineau, Quebec, Canada.
(Continued)

Primary Examiner — Lucas J. O'Donnell
(74) Attorney, Agent, or Firm — Marshall & Melhorn, LLC

(57) ABSTRACT

A heat exchanger for a battery has fluid-carrying panels and defines a multi-sided enclosure for enclosing at least two sides of the battery. The heat exchanger has first and second fluid-carrying panels defining first and second flow channels, where the first and second fluid-carrying panels are arranged at an angle to another. The heat exchanger may also include a third fluid-carrying panel defining a third flow channel, and being arranged at an angle to the second fluid-carrying panel. The heat exchanger has first and second plates sealingly joined together along their peripheries and defining a fluid flow passageway between their central fluid flow areas. The second plate may be compliant, its central fluid flow area being deformable away from the central fluid
(Continued)

flow area of the first plate in response to a pressure of a fluid inside the fluid flow passageway.

25 Claims, 18 Drawing Sheets

(51) Int. Cl.
| | |
|---|---|
| F28F 3/12 | (2006.01) |
| F28F 9/00 | (2006.01) |
| H01M 10/0525 | (2010.01) |
| H01M 10/647 | (2014.01) |
| H01M 10/625 | (2014.01) |
| H01M 10/6567 | (2014.01) |
| H01M 10/613 | (2014.01) |
| F28F 3/04 | (2006.01) |
| F28F 9/02 | (2006.01) |
| H01M 2/10 | (2006.01) |
| F28D 21/00 | (2006.01) |

(52) U.S. Cl.
CPC ............ *F28F 9/00* (2013.01); *F28F 9/0248* (2013.01); *H01M 2/1077* (2013.01); *H01M 10/0525* (2013.01); *H01M 10/613* (2015.04); *H01M 10/625* (2015.04); *H01M 10/647* (2015.04); *H01M 10/6556* (2015.04); *H01M 10/6567* (2015.04); *F28D 2021/0028* (2013.01); *F28D 2021/0029* (2013.01); *F28F 2240/00* (2013.01); *F28F 2275/08* (2013.01); *H01M 2220/20* (2013.01); *Y02E 60/122* (2013.01); *Y02P 70/54* (2015.11); *Y02T 10/7011* (2013.01)

(56) References Cited

U.S. PATENT DOCUMENTS

| | | | |
|---|---|---|---|
| 4,109,707 A | 8/1978 | Wilson et al. | |
| 4,583,583 A | 4/1986 | Wittel | |
| 4,962,444 A | 10/1990 | Niggemann | |
| 5,107,922 A | 4/1992 | So | |
| 5,205,348 A | 4/1993 | Tousignant et al. | |
| RE35,890 E | 9/1998 | So | |
| 6,723,183 B2 | 4/2004 | Oda et al. | |
| 6,742,572 B2 | 6/2004 | Muhammad et al. | |
| 7,186,478 B2 | 3/2007 | Forlino et al. | |
| 7,243,703 B2 | 7/2007 | Yamaguchi et al. | |
| 8,383,260 B2 | 2/2013 | Essinger et al. | |
| 8,492,019 B2 | 7/2013 | Klaus et al. | |
| 8,835,038 B2 | 9/2014 | Abels et al. | |
| 8,940,425 B2 | 1/2015 | Toepfer | |
| 9,050,898 B2 | 6/2015 | Syed et al. | |
| 2008/0063771 A1 | 3/2008 | Dumm | |
| 2011/0189525 A1 | 8/2011 | Palanchon et al. | |
| 2012/0107663 A1 | 5/2012 | Burgers et al. | |
| 2013/0171493 A1 | 7/2013 | Wayne et al. | |
| 2013/0244077 A1 | 9/2013 | Palanchon et al. | |
| 2014/0017545 A1 | 1/2014 | Palanchon | |
| 2014/0087231 A1 | 3/2014 | Schaefer et al. | |
| 2014/0162107 A1 | 6/2014 | Obrist et al. | |
| 2014/0220391 A1 | 8/2014 | Fujii et al. | |
| 2015/0198372 A1 | 7/2015 | Desikan et al. | |
| 2016/0190664 A1* | 6/2016 | Frohnmayer | H01M 2/1077 429/120 |
| 2016/0223264 A9 | 8/2016 | Desikan et al. | |

FOREIGN PATENT DOCUMENTS

| | | |
|---|---|---|
| CN | 102170034 A | 8/2011 |
| WO | 2014/014407 A2 | 1/2014 |

OTHER PUBLICATIONS

English Machine Translation of CN1620588A.
China National Intellectual Property Administration, Office Action for Application No. 201580033568.6, dated Jan. 14, 2019, 8 pages.

\* cited by examiner

MULTI-SIDED HEAT EXCHANGERS WITH COMPLIANT HEAT TRANSFER SURFACES

CROSS-REFERENCE TO RELATED APPLICATION

This application claims priority to and the benefit of U.S. Provisional Patent Application No. 62/017,871 filed Jun. 27, 2014, the contents of which are incorporated herein by reference.

FIELD OF THE INVENTION

The invention generally relates to heat exchangers, and particularly to heat exchangers comprising two or more fluid-carrying panels for cooling heat-generating elements such as prismatic lithium-ion battery cells.

BACKGROUND OF THE INVENTION

Rechargeable batteries such as batteries made up of many lithium-ion cells can be used in many applications, including for example in electric vehicle ("EV") and hybrid electric vehicle ("HEV") applications. Such batteries can generate large amounts of heat that needs to be dissipated.

A common type of lithium-ion battery cell is a hard shelled, prismatic cell having a generally rectangular prismatic shape, with six square or rectangular faces which meet at angular or rounded corners. One face of each cell typically carries the positive and negative terminals that carry the electric current. The electrochemically active components of the cell are wound and placed inside the shell, which is typically made from a metal such as aluminum or steel.

A typical prismatic lithium-ion battery cell has a length (extending along an "in-plane" direction) which is several times greater than its width (extending along a "through-plane" direction), such that the surface areas of the two opposed faces extending along the in-plane direction are significantly greater than the surface areas of the faces extending in the through-plane direction, including the face which carries the positive and negative terminals. The in-plane and through-plane faces of the prismatic battery cell are further described below with reference to FIG. 1.

In a typical construction, individual prismatic battery cells are packed together to form a battery pack, with the in-plane faces of adjacent cells either touching or in close proximity to one another, and with the outer faces of the battery pack being defined by the through-plane faces of the cells. Providing a single plate cooler in contact with the through-plane faces of the battery cells along one side of the battery pack does not, however, provide uniform cooling, and can result in significant temperature non-uniformity within the cell. While temperature uniformity can be improved by providing plate coolers along more than one face of the battery pack, the provision of multiple plate coolers requires a large number of coolant connections, which increases complexity, manufacturing cost, and the chance of leakage at a failed joint.

Also, in order to ensure adequate heat exchange, it is desired that the plate coolers are brought into intimate contact with the battery pack. However, achieving adequate compression between a single plate cooler and the face of a battery pack may be difficult, partly due to the fact that the through-plane faces of the individual battery cells and/or the plate cooler may not be perfectly flat, and/or due to misalignment of the battery cells in the pack. For example, as prismatic batteries age, bulges may form in the outer shells of the prismatic cells. This bulging can reduce contact between the battery cells and the plate coolers, thereby reducing heat transfer from the battery cells to the plate cooler.

In contrast to battery packs constructed from prismatic cells, battery packs constructed from thinner, soft-sided pouch cells, are optimally cooled by providing plate coolers to cool the in-plane faces of adjacent cells. However, in the case of relatively thick prismatic cells, cooling of the in-plane faces is less efficient than cooling of the through-plane faces. Due to its shape, the thermal conductivity of a prismatic lithium-ion battery cell is highly anisotropic, with the thermal conductivity of the through-plane faces being about two orders of magnitude higher than the thermal conductivity of the in-plane faces.

In a battery pack construction applicable to pouch cells, heat conductive fins are placed between the in-plane faces of adjacent cells, with the edges of the fins being connected to one or more fluid-carrying panels located along the sides of the battery pack. The fins transfer heat from the in-plane faces of the pouch cells to the coolant circulating through the panels. Such a battery pack is described in U.S. Pat. No. 8,383,260 to Essinger et al. Because this type of structure only cools the in-plane faces of the cells, and because it relies on indirect cooling by the heat conductive fins, it would not be expected to be effective for cooling prismatic cells.

There remains a need for providing multi-sided plate coolers for rechargeable battery packs constructed from prismatic cells, which provide improved heat transfer and temperature uniformity, without sacrificing simplicity, manufacturability and reliability.

SUMMARY OF THE INVENTION

In one aspect, there is provided a heat exchanger for a battery, the heat exchanger having a length and a width, comprising a plurality of fluid-carrying panels and defining a multi-sided enclosure for enclosing at least two sides of the battery The heat exchanger comprises (a) a first fluid-carrying panel defining a first flow channel extending along the length of the heat exchanger, the first fluid-carrying panel having a width; (b) a second fluid-carrying panel defining a second flow channel extending along the length of the heat exchanger, the second fluid-carrying panel having a width, wherein the first and second fluid-carrying panels are arranged at an angle to another; (c) a first manifold extending transversely across the widths of the first and second flow channels; (d) a second manifold extending transversely across the widths of the first and second flow channels; (e) an inlet opening provided in one of said manifolds; and (f) an outlet opening provided in one of said manifolds.

In an embodiment, the first and second manifolds are proximate to opposite ends of the heat exchanger.

In an embodiment, the first and second fluid-carrying panels are joined together along a first linear bend extending between the first and second manifolds. In an embodiment, first and second flow channels are separated from one another by said first linear bend.

In an embodiment, each of the first and second manifolds extends substantially transversely to the first linear bend, and extends across a width of the first fluid-carrying panel and a width of the second fluid-carrying panel, such that each of the first and second manifolds is bent.

In an embodiment, the first and second fluid-carrying panels are arranged at an angle of about 90 degrees to one another, the heat exchanger having an L-shaped cross-section in a plane transverse to said first linear bend and defining a two-sided enclosure.

In an embodiment, the heat exchanger further comprises (g) a third fluid-carrying panel defining a third flow channel extending along the length of the heat exchanger, the third fluid-carrying panel having a width, wherein the second and third fluid-carrying panels are arranged at an angle to another; wherein the first manifold extends transversely across the widths of the first, second and third flow channels; and wherein the second manifold extends transversely across the widths of the first, second and third flow channels.

In an embodiment, the second and third fluid-carrying panels are joined together along a second linear bend extending between the first and second manifolds, wherein the first and second linear bends are parallel to one another. In an embodiment, the second and third flow channels are separated from one another by said second linear bend. In an embodiment, each of the first and second manifolds extends substantially transversely to the first and second linear bends, and extends across a width of each of the first, second and third fluid-carrying panels, such that each of the first and second manifolds is bent.

In an embodiment, the first and second fluid-carrying panels are arranged at an angle of about 90 degrees to one another, and wherein the second and third fluid-carrying panels are arranged at an angle of about 90 degrees to one another, the heat exchanger having a U-shaped cross-section in a plane transverse to said linear bend, and defining an open-ended, three-sided enclosure in which the first and third fluid-carrying panels comprise opposed sides and the second panel comprises a base.

In an embodiment, the heat exchanger comprises (i) a first plate having a first thickness, and having an outer peripheral edge surrounding a central fluid flow area; (ii) a second plate having a second thickness, and having an outer peripheral edge surrounding a central fluid flow area, wherein the first and second plates are sealingly joined together along their outer peripheral edges and with the central fluid flow area of the first plate facing the central fluid flow area of the second plate, such that a fluid flow passageway is defined between the central fluid flow areas of the first and second plates and inside the outer peripheral edges of the first and second plates; wherein the fluid flow passageway comprises said flow channels; and wherein the second plate is compliant, such that the central fluid flow area of the second plate is deformable in a direction away from the central fluid flow area of the first plate in response to a pressure of a fluid inside the fluid flow passageway. In an embodiment, the second thickness is less than the first thickness, and wherein the first plate is rigid. In an embodiment, the first plate is compliant, such that the central fluid flow area of the second plate is deformable in a direction away from the central fluid flow area of the second plate in response to a pressure of a fluid inside the fluid flow passageway. In an embodiment, at least one support element is provided in the fluid flow passageway, and extends between the first and second plates. In an embodiment, the at least one support element is joined to one of the first and second plates.

In an embodiment, the heat exchanger comprises a plurality of said support elements, and wherein each of said support elements comprises a protrusion having a base which is joined to one of the first and second plates and a free end which is proximate to and/or in contact with the other of the first and second plates. In an embodiment, the protrusions are in the form of ribs or dimples formed in the central fluid flow area of the first plate and/or the central fluid flow area of the second plate, or in the form of a turbulizer or corrugated fin.

In an embodiment, the first and second plates are comprised of aluminum or an aluminum alloy, and the outer peripheral edges of the first and second plates are sealingly joined together by brazing or welding. In an embodiment, at least the second plate is comprised of a metallic or non-metallic material having lower thermal conductivity than aluminum. In an embodiment, the metallic or non-metallic material having lower thermal conductivity than aluminum is plastic.

In an embodiment, the heat exchanger includes said first and second linear bends to define said first, second and third fluid-carrying panels, wherein the first and second plates are in contact with one another along the first and second linear bends, between the manifolds, so as to divide the fluid flow passageway into three separate flow channels, each of which extends between the first and second manifolds.

In an embodiment, the heat exchanger further comprises one or more heat-generating elements, each of which is received inside said multi-sided enclosure. In an embodiment, the one or more heat generating elements comprises a plurality of prismatic battery cells together comprising a battery pack, wherein each of the prismatic battery cells comprises a rectangular prism having two in-plane faces and four through-plane faces, wherein the through-plane faces are parallel to the first linear bend and perpendicular to the in-plane faces, and wherein each of the fluid-carrying panels is in contact with and/or in close proximity to one of the through-plane faces of each of said battery cells. In an embodiment, the heat exchanger comprises a first plate having a first thickness, and a second plate having a second thickness, the first and second plates each having an outer peripheral edge surrounding a central fluid flow area, wherein the first and second plates are sealingly joined together along their outer peripheral edges and with the central fluid flow area of the first plate facing the central fluid flow area of the second plate, such that a fluid flow passageway is defined between the central fluid flow areas of the first and second plates and inside the outer peripheral edges of the first and second plates; wherein the fluid flow passageway comprises said flow channels; and wherein the second plate is compliant, such that the central fluid flow area of the second plate is deformable in a direction away from the central fluid flow area of the first plate in response to a pressure of a fluid inside the fluid flow passageway; and wherein the prismatic battery cells have rounded corners, such that gaps exist between the rounded corners of the prismatic battery cells and the second plate of the heat exchanger. In an embodiment, the second plate is provided with pre-formed ribs which are adapted to extend into gaps produced by the rounded corners of the battery cells.

In an embodiment, the first manifold consists of an inlet manifold space in flow communication with the first and second flow channels; wherein the inlet opening is provided in the first manifold; wherein the second manifold consists of an outlet manifold space in flow communication with the first and second flow channels; and wherein the outlet opening is provided in the second manifold.

In an embodiment, the heat exchanger includes a plurality of support elements in the fluid flow passageway, and wherein each of said support elements comprises a rib or a dimple having a base which is joined to one of the first and second plates and a free end which is proximate to and/or in contact with the other of the first and second plates; wherein the inlet opening is provided in a portion of the first manifold located in the first fluid-carrying panel; wherein the outlet opening is provided in a portion of the second manifold located in the second fluid-carrying panel; and wherein a proportion of a total surface area of the first flow channel occupied by the support elements is less than a proportion of a total surface area of the second flow channel occupied by the support elements. In an embodiment, a density of the support elements in the second flow channel is greater than a density of the support elements in the first flow channel.

In an embodiment, the first manifold consists of an inlet manifold space in flow communication with the first, second and third flow channels; wherein the inlet opening is provided in the first manifold; wherein the second manifold consists of an outlet manifold space in flow communication with the first, second and third flow channels; and wherein the outlet opening is provided in the second manifold.

In an embodiment, the heat exchanger includes a plurality of support elements in the fluid flow passageway, and wherein each of said support elements comprises a rib or a dimple having a base which is joined to one of the first and second plates and a free end which is proximate to and/or in contact with the other of the first and second plates; wherein the inlet opening is provided in a portion of the first manifold located in the first fluid-carrying panel; wherein the outlet opening is provided in a portion of the second manifold located in the third fluid-carrying panel; wherein a proportion of a total surface area of the first flow channel occupied by the support elements is less than a proportion of a total surface area of the second flow channel occupied by the support elements; and wherein a proportion of a total surface area of the second flow channel occupied by the support elements is less than a proportion of a total surface area of the third flow channel occupied by the support elements. In an embodiment, a density of the support elements in the second flow channel is greater than a density of the support elements in the first flow channel, and a density of the support elements in the third flow channel is greater than the density of the support elements in the second flow channel.

In an embodiment, the first manifold consists of an inlet manifold space in flow communication with the first flow channel, and an outlet manifold space in flow communication with the second flow channel; wherein the inlet opening is provided in the inlet manifold space of the first manifold; wherein the outlet opening is provided in the outlet manifold space of the first manifold; and wherein the second manifold consists of a turnaround manifold space in flow communication with the first and second flow channels.

In an embodiment, the heat exchanger includes a plurality of support elements in the fluid flow passageway, and wherein each of said support elements comprises a rib or a dimple having a base which is joined to one of the first and second plates and a free end which is proximate to and/or in contact with the other of the first and second plates; wherein a proportion of a total surface area of the first flow channel occupied by the support elements is less than a proportion of a total surface area of the second flow channel occupied by the support elements.

In an embodiment, a density of the support elements in the second flow channel is greater than a density of the support elements in the first flow channel.

In an embodiment, the first manifold consists of (a) an inlet manifold space in flow communication with the first flow channel and a first portion of the second flow channel proximate to the first flow channel; and (b) an outlet manifold space in flow communication with the third flow channel and a second portion of the second flow channel proximate to the third flow channel; wherein the inlet opening is provided in the inlet manifold space of the first manifold; wherein the outlet opening is provided in the outlet manifold space of the first manifold; wherein the first and second portions of the second flow channel are separated by an elongate flow barrier extending between the first and second manifolds; wherein the second manifold consists of a turnaround manifold space in flow communication with the first, second and third flow channels.

In an embodiment, the heat exchanger includes a plurality of support elements in the fluid flow passageway, and wherein each of said support elements comprises a rib or a dimple having a base which is joined to one of the first and second plates and a free end which is proximate to and/or in contact with the other of the first and second plates; wherein a proportion of a total surface area of the first flow channel and the first portion of the second flow channel occupied by the support elements is less than a proportion of a total surface area of the second portion of the second flow channel and the third flow channel occupied by the support elements. In an embodiment, a density of the support elements in the second portion of the second flow channel and the third flow channel is greater than a density of the support elements in the first flow channel and the first portion of the second flow channel.

In an embodiment, the first manifold consists of an inlet manifold space in flow communication with the first flow channel, and a turnaround manifold space in flow communication with the second and third flow channels; wherein the second manifold consists of a turnaround manifold space in flow communication with the first and second flow channels, and an outlet manifold space in flow communication with the third flow channel; wherein the inlet opening is provided in the inlet manifold space of the first manifold; and wherein the outlet opening is provided in the outlet manifold space of the second manifold.

In an embodiment, the heat exchanger includes a plurality of support elements in the fluid flow passageway, and wherein each of said support elements comprises a rib or a dimple having a base which is joined to one of the first and second plates and a free end which is proximate to and/or in contact with the other of the first and second plates; wherein a proportion of a total surface area of the first flow channel occupied by the support elements is less than a proportion of a total surface area of the second flow channel occupied by the support elements; and wherein a proportion of a total surface area of the second flow channel occupied by the support elements is less than a proportion of a total surface area of the third flow channel occupied by the support elements. In an embodiment, a density of the support elements in the second flow channel is greater than a density of the support elements in the first flow channel, and a density of the support elements in the third flow channel is greater than the density of the support elements in the second flow channel.

BRIEF DESCRIPTION OF THE DRAWINGS

The embodiments will now be described, by way of example only, with reference to the accompanying drawings in which.

DETAILED DESCRIPTION

Figure 1:
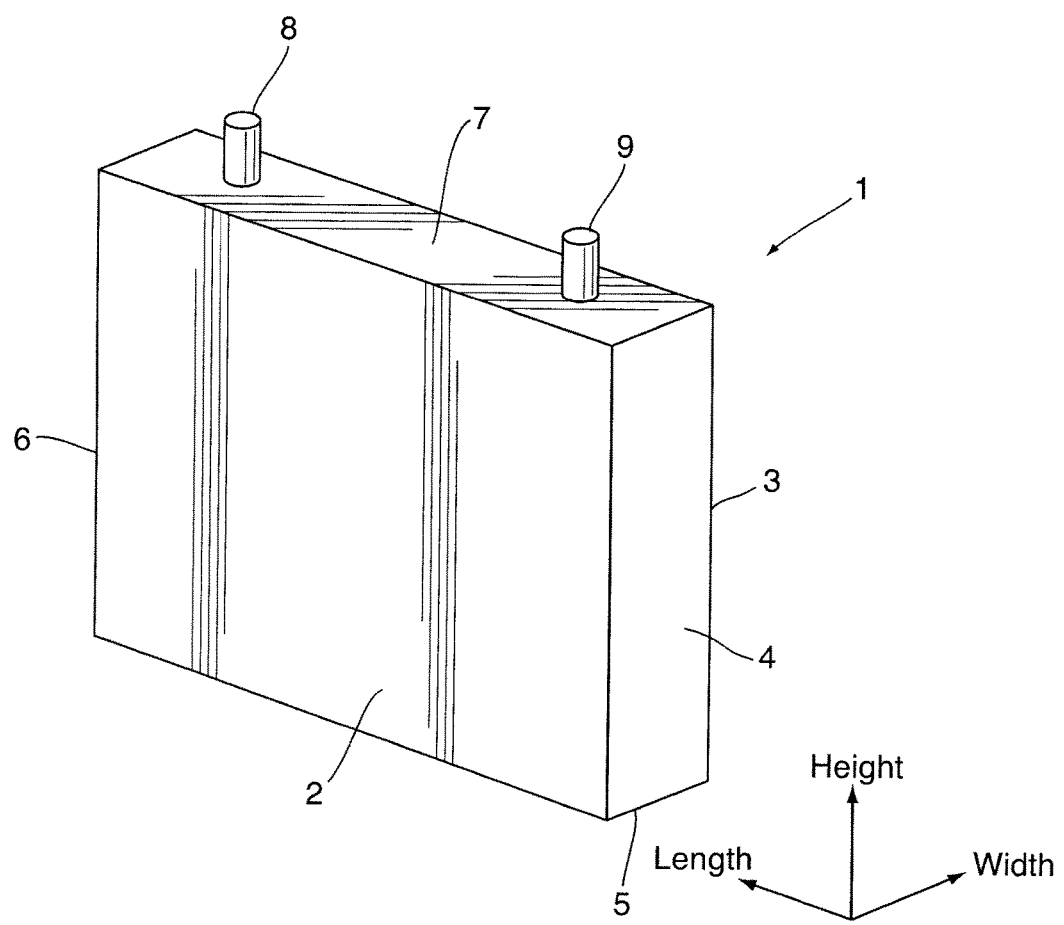
FIG. 1 is a perspective view of a conventional prismatic lithium-ion battery cell.

The heat exchangers described herein are adapted for cooling heat-generating objects having one or more surfaces to be cooled. In the specific embodiments disclosed herein, the heat-generating objects may comprise rechargeable battery packs for electric or hybrid vehicles, and more specifically rechargeable battery packs comprised of hard shelled, prismatic battery cells. It will be appreciated that the heat exchangers and/or the battery packs shown in the drawings may not be drawn to scale.

Each battery pack may comprise a plurality of prismatic lithium-ion battery cells 1. As shown in FIG. 1, each battery cell 1 has a hard outer shell which may generally be in the shape of a rectangular prism having six square or rectangular faces, labeled 2 to 7 in FIG. 1. Face 7 carries the positive and negative terminals 8, 9 that carry the electric current.

The in-plane faces of the battery cell 1 in FIG. 1 are labeled 2 and 3, and are each defined by the length and height of the cell 1, in the in-plane direction. The through-plane faces of the battery cell 1 are labeled 4, 5, 6 and 7. Faces 4 and 6 are each defined by the width and height of the cell 1, whereas faces 5 and 7 are defined by the width and length of the cell 1. In the following description, the through-plane faces 4 and 6 are sometimes referred to herein as the sides of the cell 1; the through-plane faces 5 and 7 are sometimes referred to herein as the bottom and top of the cell 1, respectively; and the in-plane faces 2 and 3 are sometimes referred to herein as the front and back of the cell 1.

A heat exchanger 50 according to a first embodiment is now described below with reference to FIGS. 2 to 9.

Heat exchanger 50 is an example of a panel-type heat exchanger having one or more linear bends so as to define a multi-faceted heat exchanger structure comprising a plurality of fluid-carrying panels, wherein each of the panels comprises one facet of the overall structure. In this embodiment, there are two linear bends 52, 54 which are parallel to one another and spaced apart from one another. The bends 52, 54 each form an angle of about 90°, and together define an open-ended, three-sided enclosure comprising first, second and third fluid-carrying panels 56, 58, 60. The first and third fluid-carrying panels 56, 60 comprise opposed sides of the three-sided enclosure and the second fluid-carrying panel 58 comprises the base of the enclosure.

In heat exchanger 50, each of the fluid-carrying panels 56, 58, 60 has an inwardly facing side and an outwardly facing side. The inwardly facing sides of fluid-carrying panels 56, 58, 60 face the interior of the enclosure formed by the heat exchanger 50.

The heat exchanger 50 according to the first embodiment is constructed from two multi-faceted plates, with the outwardly facing sides of fluid-carrying panels 56, 58, 60 being formed by a relatively thick first plate 12, and the inwardly facing sides of fluid-carrying panels 56, 58, 60 being formed by a relatively thin second plate 14.

The first plate 12 has a first thickness and has an outer peripheral edge 16 surrounding a central fluid flow area 20. The first plate 12 is shaped so as to define a peripheral sealing flange 18 extending along the outer peripheral edge 16, and through which the first plate 12 is joined to the second plate 14. It will be seen that in each of the panels 56, 58, 60, the central fluid flow area 20 and the peripheral sealing flange 18 are both substantially planar, with the plane of the peripheral sealing flange 18 being raised relative to the plane of the central fluid flow area 20. This can be seen, for example, in the cross-sections of FIGS. 4 to 6, which are taken in a plane which is parallel to the in-plane faces 2, 3 of the battery cells 1.

The second plate 14 has a second thickness which is less than the first thickness of the first plate 12, and also has an outer peripheral edge 22 surrounding a central fluid flow area 24. In each of the panels 56, 58, 60, it can be seen from the drawings that the outer peripheral edge 22 and the central fluid flow area 24 of the second plate 14 are substantially co-planar.

The first and second plates 12, 14 are sealingly joined together along their outer peripheral edges 16, 22 and with the central fluid flow area 20 of the first plate 12 facing the central fluid flow area 24 of the second plate 14, and spaced therefrom so as to define a fluid flow passageway 26 extending throughout the three fluid-carrying panels 56, 58, 60. The outer edges of passageway 26 are defined by the outer peripheral edges 16, 22 of the first and second plates 12, 14.

Figure 2:
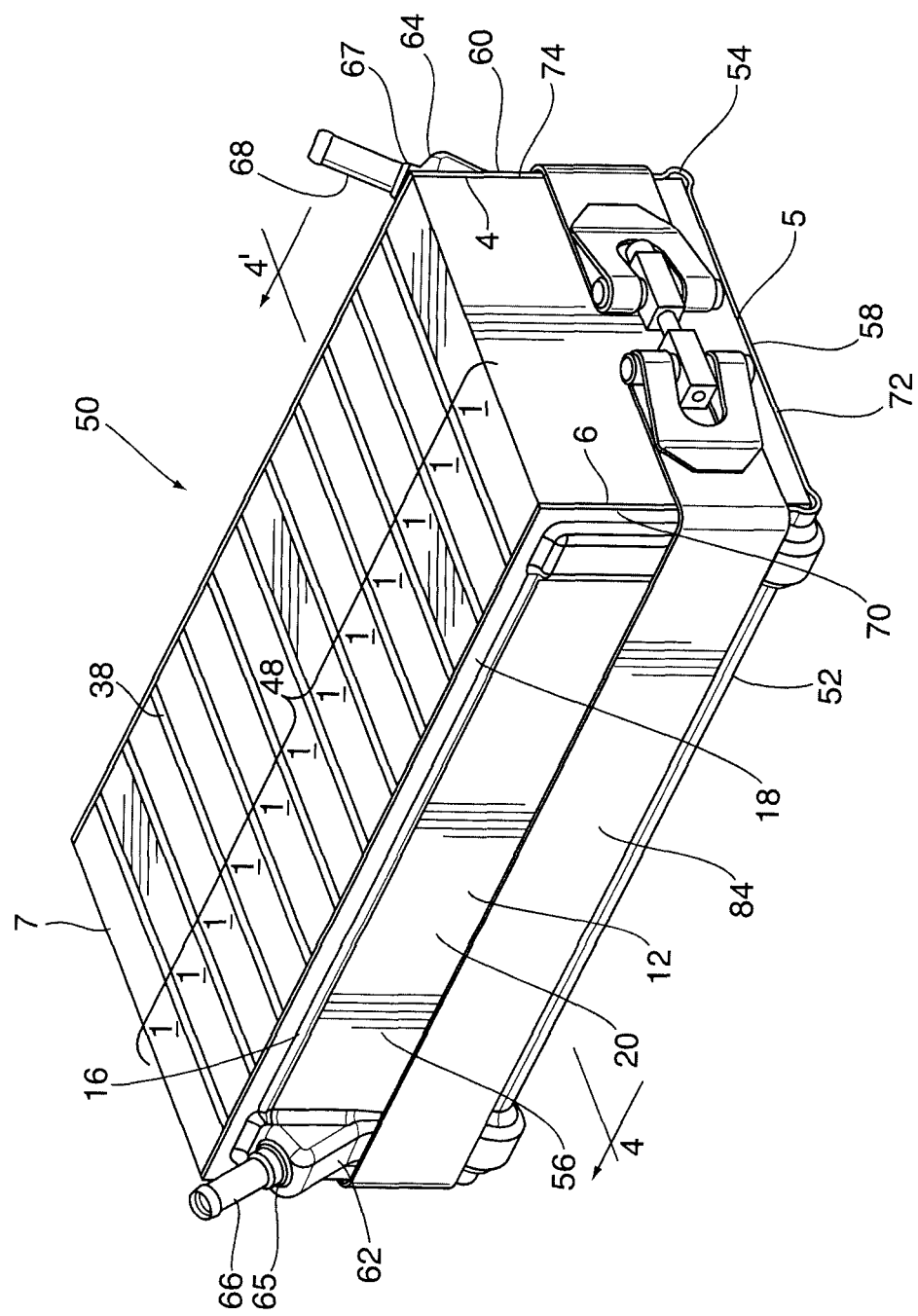
FIG. 2 is a top perspective view of a heat exchanger according to a first embodiment.
Figure 3:
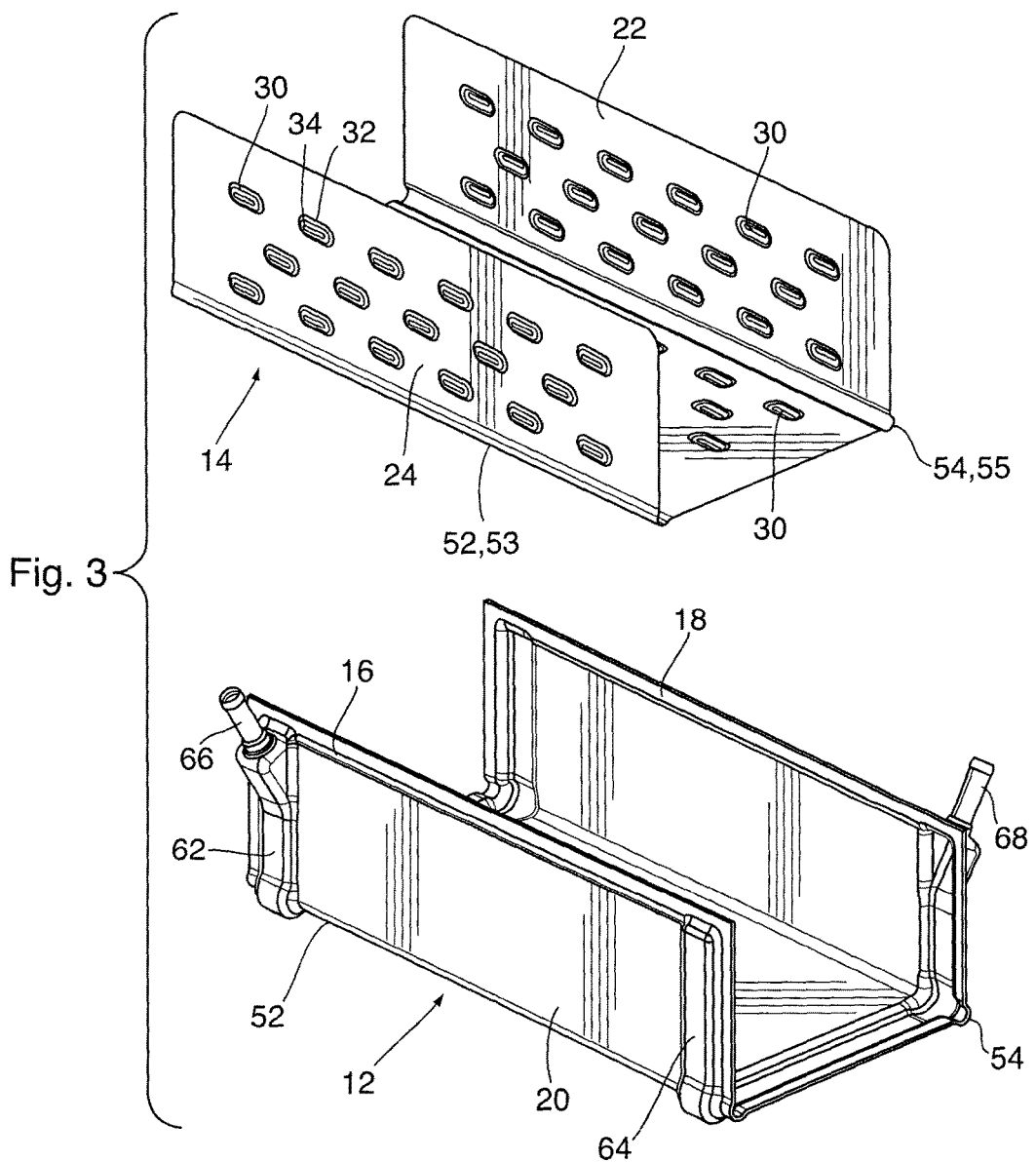
FIG. 3 is an exploded perspective view of the heat exchanger of FIG. 2.

As will be further described below, the heat exchanger 50 also includes an inlet opening 65 and inlet fitting 66 and an outlet opening 67 and outlet fitting 68 in flow communication with the fluid flow passageway 26. Due to the greater thickness of the first plate 12, it may be desired to provide both the inlet and outlet openings 65, 67 and their corresponding fittings 66, 68 in the first plate 12, as shown in FIGS. 2 and 3.

In the illustrated embodiment, the second thickness of the second plate 14 is significantly less than the first thickness of the first plate 12. The first thickness of the first plate 12 is sufficient to provide the heat exchanger 50 with structural rigidity, wherein the first plate 12 is also thick enough that it is not significantly deformed by the pressure of a fluid, such as a gaseous or liquid coolant or refrigerant flowing through the fluid flow passageway 26. While the first thickness of the first plate 12 depends at least partly on the material from which it is made, the first thickness may be in the range from about 1 to about 2 mm.

The second thickness of the second plate 14 may be sufficiently thin to render the second plate 14 deformable or compliant. The compliance of the second plate 14 allows the central fluid flow area 24 of second plate 14 to be deformable in a direction away from the central fluid flow area 20 of the first plate 12 in response to the pressure of the fluid flowing through the fluid flow passageway 26. While the second thickness of the second plate 12 depends at least partly on the material from which it is made, the second thickness may be in the range from about 0.1 to about 1.0 mm, wherein the first thickness is typically from about 2 to about 3 times the second thickness.

In an embodiment, the first and second plates 12, 14 may be comprised of aluminum or an aluminum alloy, in which case the outer peripheral edges 16, 22 of the first and second plates 12, 14 may be sealingly joined together by brazing or welding. It will be appreciated, however, that it is not necessary to form first plate 12 and/or second plate 14 from aluminum. For example, in embodiments where the second plate 14 is relatively thin and compliant, the material comprising second plate 14 may not need to be of such a high thermal conductivity as aluminum. For example, adequate heat transfer through the second plate 14 may be achieved where the second plate 14 is constructed from a material having a lower thermal conductivity than aluminum, such as plastic.

The construction of the second plate 14 from plastic may provide additional benefits, in that it may permit the elimination of the layer of non-electrically conductive interfacing material (not shown) which would otherwise be laminated onto the second plate 14 to prevent the conduction of electricity between the battery cells 1 and the heat exchanger 50. Where the first plate 12 is comprised of a metal such as aluminum and the second plate 14 is comprised of plastic, it will be appreciated that the plates 12 and 14 may not necessarily be assembled as shown in the drawings, with a joint being formed between the flat, planar peripheral edges 16, 22 of first and second plates 12, 14. Rather, as is known in the construction of composite radiator tanks, the peripheral edge 16 or 22 of one of the plates 12 or 14 may be crimped or otherwise deformed over the peripheral edge 16 or 22 of the other plate 12 or 14 so as to form a sealed joint. This alternate construction is shown in dotted lines in FIG. 6, with the peripheral edge 16 of the thicker first plate 12 being crimped over the peripheral edge 22 of the thinner second plate 14, wherein the crimping of the first plate 12 is identified by reference numeral 28.

It will be appreciated that it is also possible to construct both plates 12, 14 from a metallic or non-metallic material other than aluminum, including plastic. Also, it is possible to construct the second plate 14 of aluminum and to construct the first plate 12 of a metallic or non-metallic material other than aluminum, including plastic.

In view of the relatively thin, flexible nature of the second plate 14 of heat exchanger 50, at least one support element is provided in the fluid flow passageway 26, for the purpose of supporting the second plate 14 and maintaining its spacing from the first plate 12. Each of these support elements extends between the first and second plates 12, 14. The support elements may have various forms, and may either be separately formed from both of the plates 12, 14, or they may be integrally formed with or joined to one of the plates 12, 14.

Figure 6:
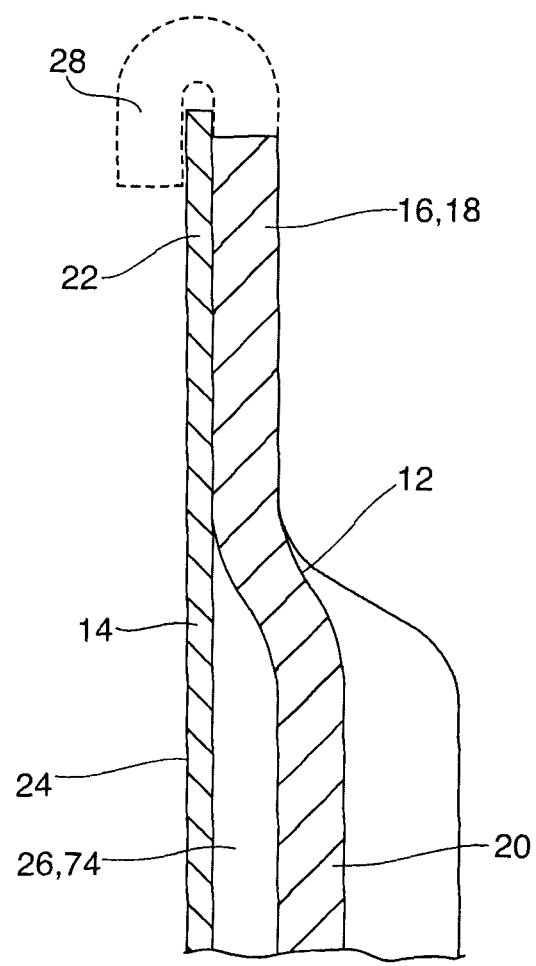
FIG. 6 is an enlarged portion of the cross-section of FIG. 4, showing the edge of panel 60.
Figure 7:
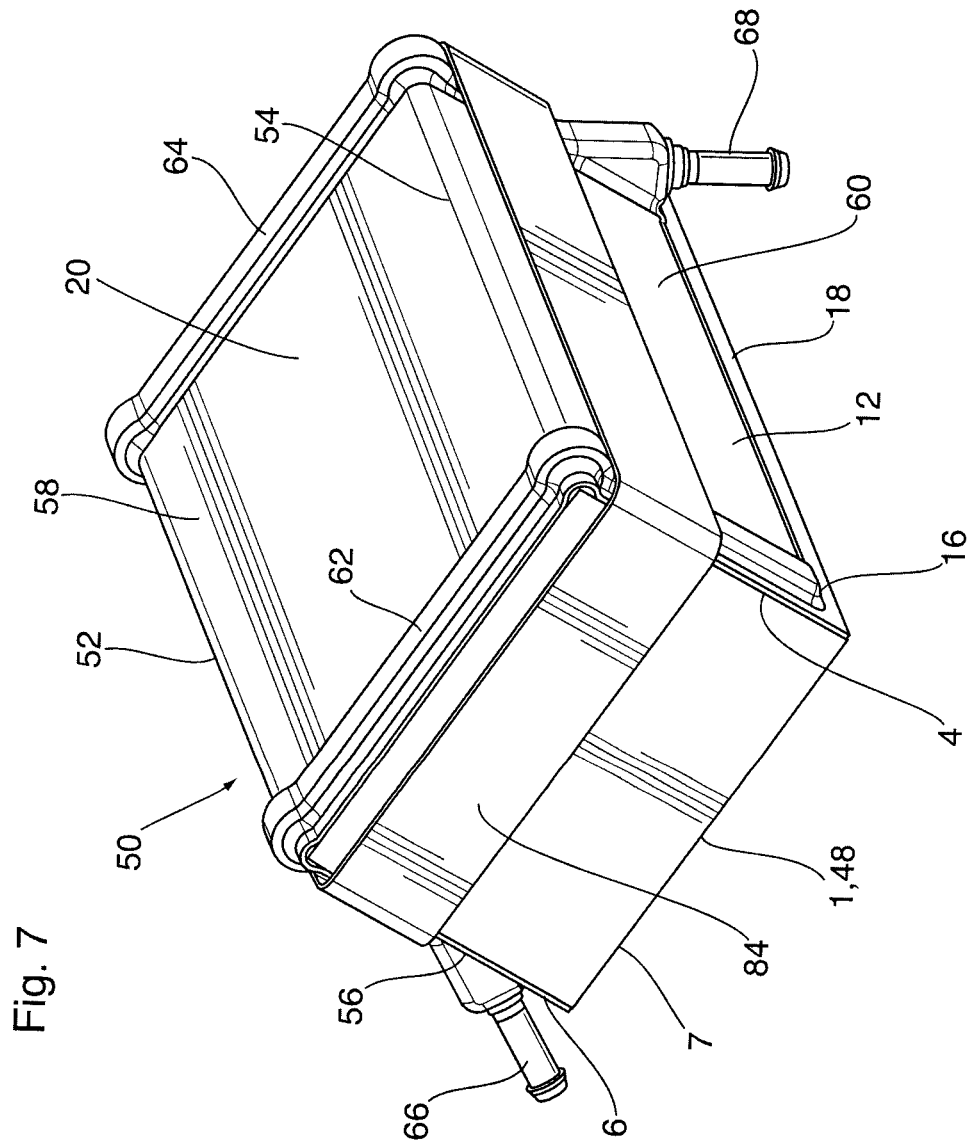
FIG. 7 is a bottom perspective view of the heat exchanger of FIG. 2.

Heat exchanger 50 shown in FIGS. 6 and 7 includes a plurality of support elements 30, each having a base 32 which is joined to one of the first and second plates 12 or 14, and a free end 34 which is proximate to, and/or in contact with, the other of the plates 12 or 14. In the illustrated embodiment, the base of each support element 30 is joined to, and integrally formed with, the central fluid flow area 20 of the first plate 12. However, as illustrated in other embodiments described below, at least some of these support elements 30 could instead be joined to the second plate 14.

In heat exchanger 50, the support elements 30 comprise a plurality of protrusions, in the form of intermittently spaced ribs or dimples formed in the central fluid flow area 24 of the second plate 14. As shown in the enlarged cross section of FIG. 5, each support element 30 has a base 32 joined to the second plate 14 and a free end 34 which is in close proximity to, and/or in contact with, the central fluid flow area 20 of the first plate 12. However, the free ends 34 of support elements 30 are not bonded in any way to the first plate 12, so as to permit deformation or flexing of the central fluid flow area 24 of the second plate 14 away from the first plate 12 in response to fluid pressure inside the fluid flow passage 26. In addition to providing support for the second plate 14, the support elements 30 also serve to augment heat transfer from the second plate 14 to the first plate 12, and also to direct the flow of coolant within the fluid flow passageway 26.

Figure 8:
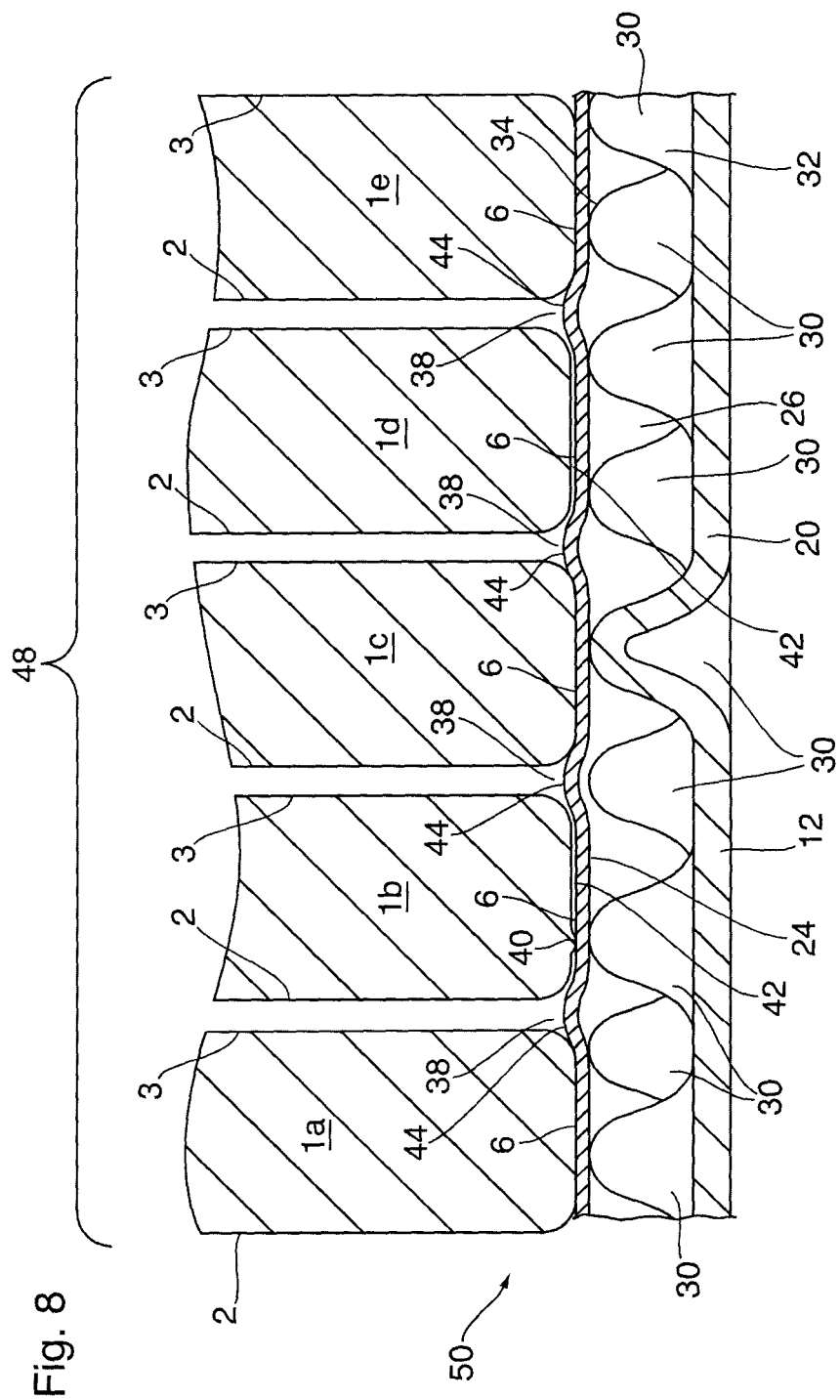
FIGS. 8 and 9 are partial cross-sections through one of the panels of the heat exchanger of FIG. 2, taken in a plane which is parallel to the through-plane faces of the battery cells.
Figure 9:
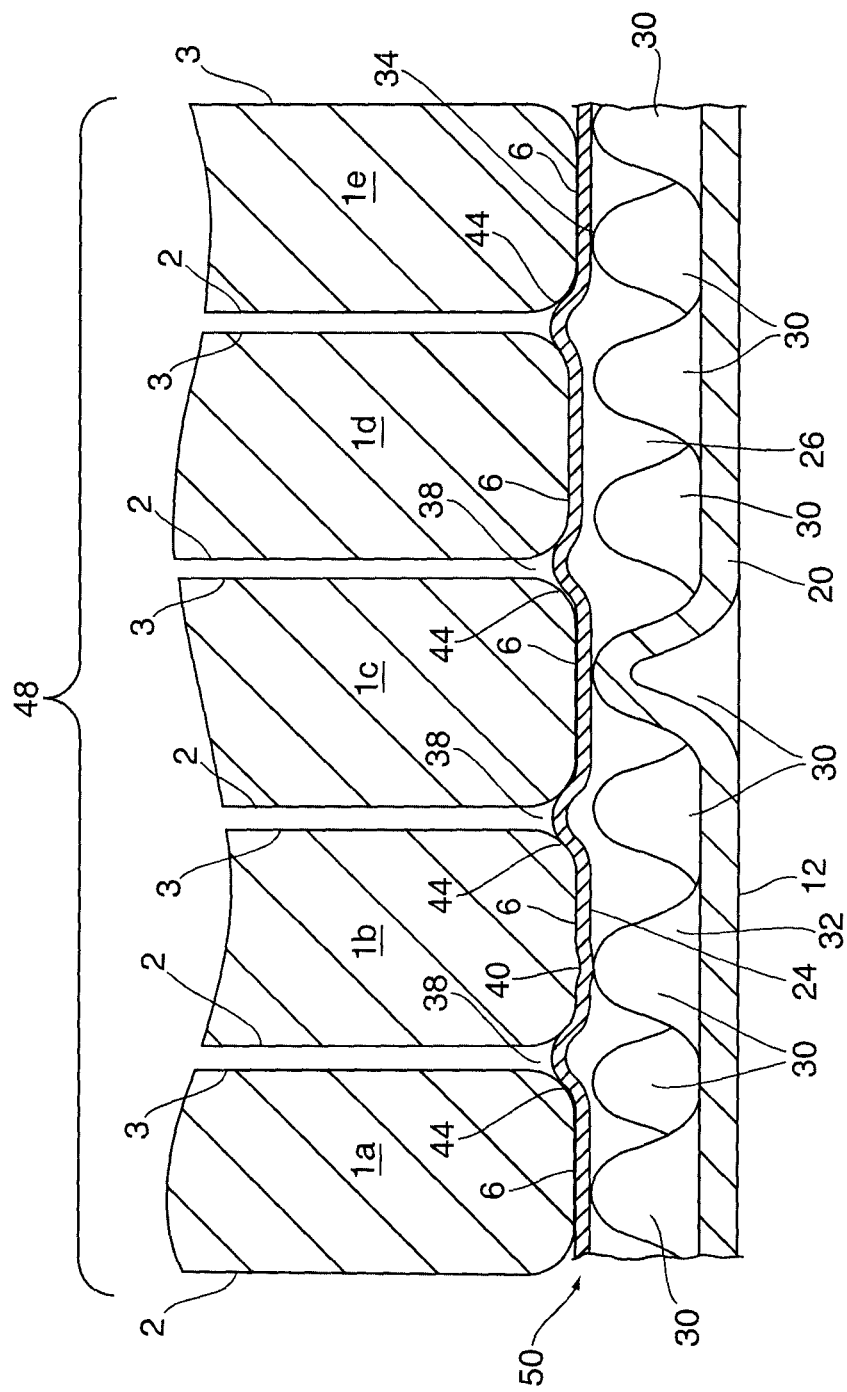

In the present embodiment, the support elements 30 are formed in the second plate 14 by stamping, and the free ends 34 may be flat. Alternatively, as shown in FIGS. 8 and 9, the support elements 30 may comprise a plurality of protrusions in the form of intermittently spaced ribs or dimples formed in the central fluid flow area 20 of the first plate 12, each support element 30 having a base 32 joined to the first plate 12 and a free end 34 which is in close proximity to, and/or in contact with, the central fluid flow area 24 of the second plate 14. As also shown in FIGS. 8 and 9, the free ends 34 of the support elements 30 may be rounded rather than flat, as shown in FIGS. 4 and 5.

Rather than providing support elements 30 in the form of ribs or dimples, it will be appreciated that support elements may instead comprise turbulence-enhancing insert such as turbulizers or corrugated fins. Each turbulizer or fin may be received between the first and second plates 12 and 14, and may be secured to either the first or second plate 12 or 14 by brazing or welding. As used herein, the terms "corrugated fin" and "turbulizer" are intended to refer to corrugated turbulence-enhancing inserts having a plurality of axially-extending ridges or crests connected by sidewalls, with the ridges being rounded or flat. As defined herein, a "fin" has continuous ridges whereas a "turbulizer" has ridges which are interrupted along their length, so that axial flow through the turbulizer is tortuous. Turbulizers are sometimes referred to as offset or lanced strip fins, and examples of such turbulizers are described in U.S. Pat. No. Re. 35,890 (So) and U.S. Pat. No. 6,273,183 (So et al.). The patents to So and So et al. are incorporated herein by reference in their entireties. In the present embodiment, it will be appreciated that a separate turbulence-enhancing insert may be provided in each panel 56, 58, 60.

Figure 4:
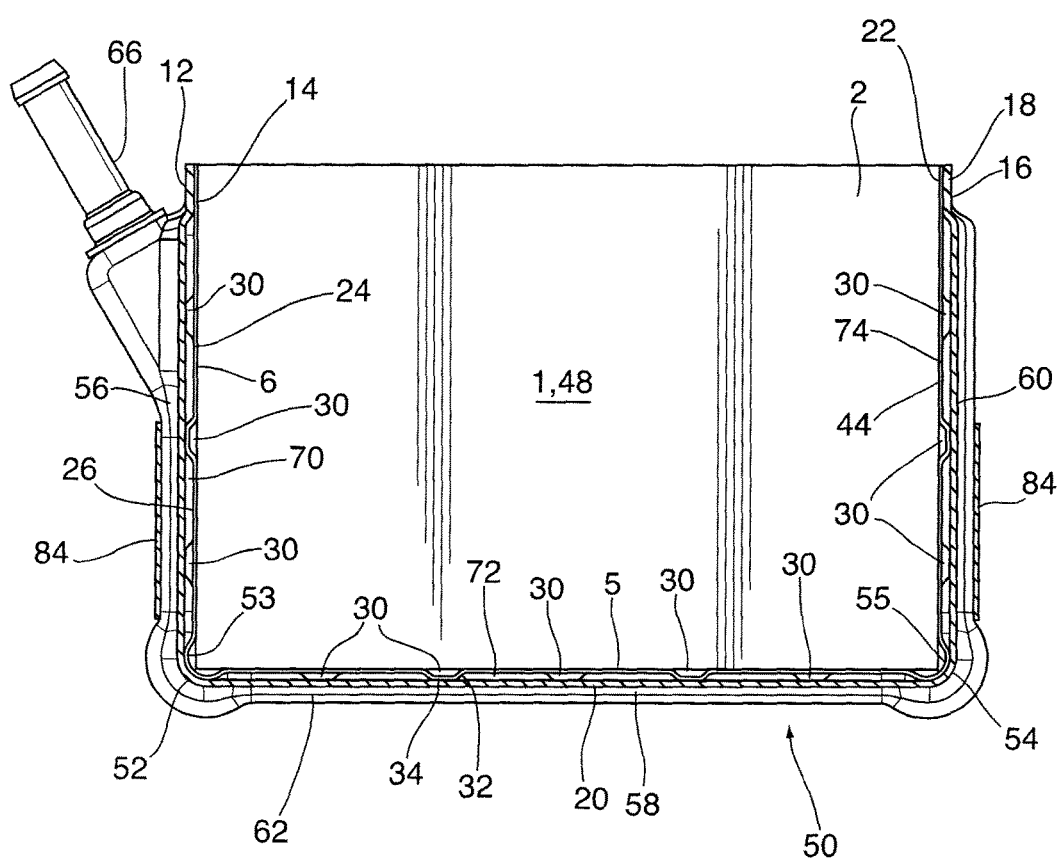
FIG. 4 is a cross-section along line 4-4' of FIG. 2.
Figure 5:
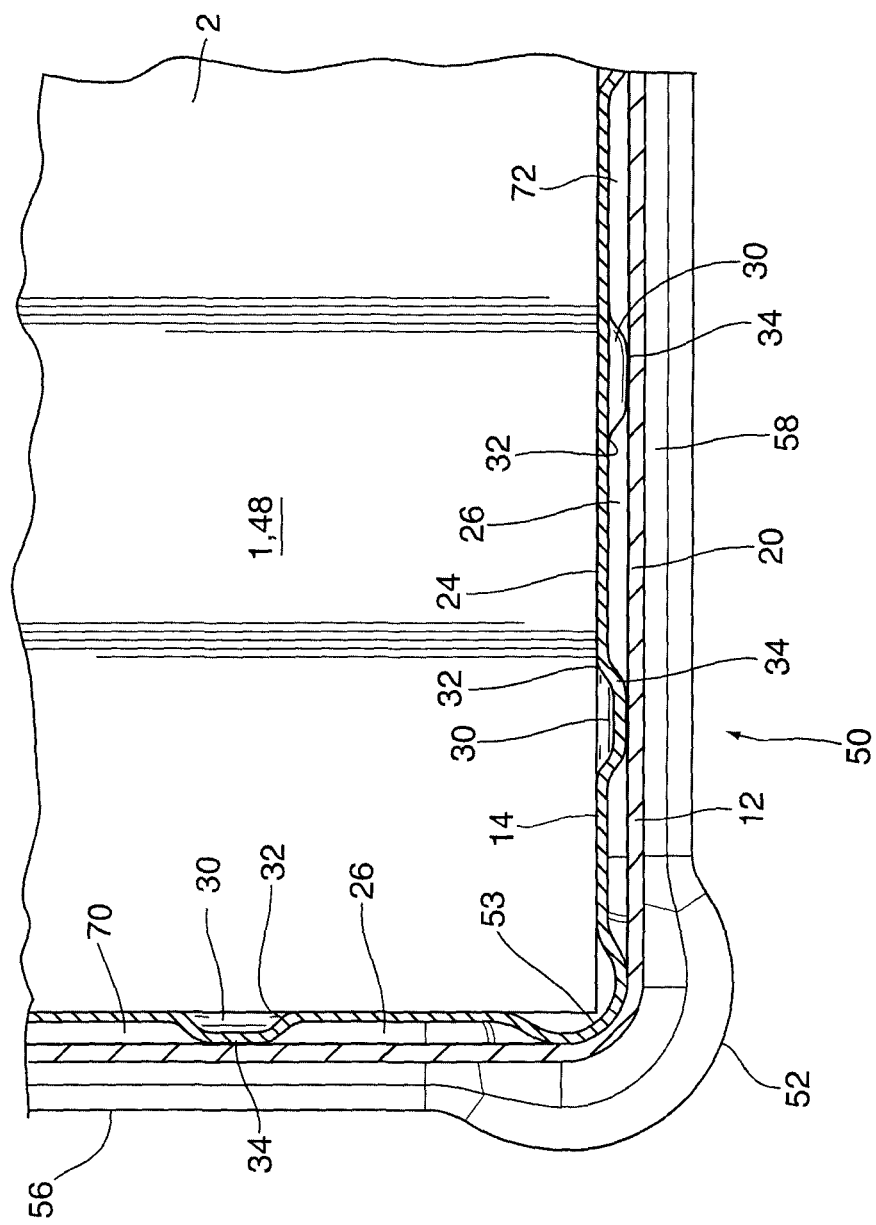
FIG. 5 is an enlarged portion of the cross-section of FIG. 4, showing the corner formed by the linear bend 52 between panels 56 and 58.

FIGS. 2 and 4 illustrate that the second plate 14 of heat exchanger 50 is in contact with a heat-generating element which, in the present embodiment, comprises a battery pack 48 incorporating a plurality of prismatic battery cells 1, each of which has three of its through-plane faces 4, 5, 6 in contact with and/or proximate to a respective fluid-carrying panel 60, 58, 56 and, in particular, being in contact with and/or proximate to the second plate 14. For the purpose of the following discussion, the prismatic battery cells 1 in FIG. 2 are labeled as 1a, 1b, 1c, 1d and 1e.

The in-plane faces 2, 3 of adjacent battery cells 1 of battery pack 48 will generally be separated by small spaces 38. The size of these spaces is somewhat exaggerated in the cross-sections of FIGS. 8 and 9, which are taken in a plane which is parallel to the through-plane faces 4, 5, 6, 7 of the battery cells 1. As shown in these drawings, the corners of the battery cells 1 may be rounded such that the spaces 38 become wider at the rounded corners of the battery cells 1.

In FIG. 8 the heat exchanger 50 is unpressurized, and the second plate 14 is substantially flat and undeformed. As shown in FIG. 8, there may be some areas where the contact between the heat exchanger 50 and the through-plane faces 4, 5 and 6 (only through-plane face 6 is shown) of the battery cells 1 is less than ideal, for example due to bulges 40 as in battery cell 1b, or other irregularities on the outer shells of battery cells 1, or due to misalignment as in battery cell 1d, both of which result in the creation of gaps 42 between the heat exchanger 50 and the through-plane faces 4, 5, 6 of the battery cells 1.

FIG. 3 illustrates the heat exchanger 50 in a pressurized condition, wherein an outwardly directed force is exerted on the second plate 14 by a fluid flowing through the fluid flow passageway 26, tending to push the second plate 14 away from the first plate 12 and into intimate engagement with the battery pack 48. The creation of intimate contact between the second plate 14 and the battery pack 48 provides improved heat transfer, and may result in some local deformation or bending of the second plate 14 away from the first plate 12. For example, there may be some localized bulging of the second plate 14 into spaces 38 between adjacent battery cells 1. It will be appreciated that the lack of a connection between the free ends 34 of the support elements 30 and the adjacent first or second plate 12, 14 permits this deformation to occur.

In addition, where the through-plane faces 4, 5 and 6 of the battery cells 1 are non-planar or are misaligned, the fluid pressure within fluid flow passageway 26 causes localized deformation of second plate 14 and pushes it into contact with the through-plane faces 4, 5, 6 of the battery cells 1 to substantially eliminate gaps 42, and thereby improve heat transfer. This improvement in heat transfer between battery pack 48 and heat exchanger 10 also reduces the need for the second plate 14 to be constructed from a material such as aluminum having high thermal conductivity.

In embodiments where the corners of the battery cells 1 are rounded, it may be desirable to provide the second plate 14 with ribs 44 as shown in FIGS. 8 and 9 to partially fill the widened portions of spaces 38, particularly between the rounded corners of battery cells 1 and the second plate 14. It will be appreciated that ribs 44 are pre-formed during production of the second plate 14, and are not created by fluid pressure within heat exchanger 50. However, the ribs 44 themselves become deformed so as to more completely reduce the area of the gaps 38 in the vicinity of the rounded corners of battery cells 1 once the heat exchanger 50 is pressurized, as shown in FIG. 9.

Heat exchanger 50 further comprises a first manifold 62 and a second manifold 64, wherein an inlet opening 65 and inlet fitting 66 are provided in the first manifold 62 and an outlet opening 67 and outlet fitting 68 are provided in the second manifold 64. Therefore, in the present embodiment, the first manifold 62 is an inlet manifold and the second manifold 64 is an outlet manifold. The fittings 66, 68 are adapted for connection to coolant conduits of a coolant circulation system (not shown). The first and second manifolds 62, 64 are located at opposite ends of the three-sided enclosure, each being located proximate to one of the open ends. Thus, a fluid flow direction is defined along the lengths of the panels 56, 58, 60, with the direction of fluid flow being generally parallel to the linear bends 52, 54 and to the through-plane faces 4, 5, 6, 7 of the battery cells 1.

As can be seen from FIGS. 2 to 5 and 7, the first and second manifolds 62, 64 extend continuously along the first, second and third panels 56, 58, 60 in a direction which is transverse to the linear bends 52, 54 and the direction of fluid flow, and parallel to the in-plane faces 2, 3 of the battery cells 1. Accordingly, the first and second manifolds 62, 64 distribute the fluid throughout the width of each panel 56, 58, 60, the width being transverse to the direction of fluid flow. This ensures uniform fluid distribution throughout the three sided enclosure of heat exchanger 50.

In the heat exchanger 50, the first and second manifolds 62, 64 are formed in the relatively rigid first plate 12, and comprise continuous U-shaped raised areas or bubbles extending transversely along the entirety of the fluid flow area 20 first plate 12, wherein these raised areas may be formed by stamping during manufacture of plate 12.

It can be seen from the cross-sections of FIGS. 4 and 5 that the first plate 12 and the second plate 14 are in continuous contact with one another at the corners formed by linear bends 52, 54, except in the first and second manifolds 62, 64 where separation between first and second plates 12, 14 is maintained to permit the first and second manifolds 62, 64 to distribute fluid throughout all three fluid-carrying panels 56, 58, 60. The contact between the first and second plates 12, 14 at corners 52, 54 extends throughout the length of the fluid flow passageway 26, and avoids fluid flow along the corners of heat exchanger 50, where there is no direct contact between the heat exchanger 50 and the battery cells 1, and consequently no cooling. This has the effect of dividing the fluid flow passageway 26 into three separate channels 70, 72, 74, each of which is in flow communication with the first and second manifolds 62, 64. In this embodiment, the area of contact between bends 52, 54 extends substantially the entire distance between the first and second manifolds 62, 64, and between the first and second manifolds and the edges of the first and second plates 12, 14.

As shown in FIGS. 3 to 5, the contact between the plates 12, 14 in the area of bends 52, 54 may be provided by outwardly extending elongate ribs 53, 55 provided in the second plate 14 in the area of respective bends 52, 54. The ribs 53, 55 are continuous, and have a length which is substantially the same as the length of the second plate 14, as shown in FIG. 3.

FIGS. 2 and 7 show a battery pack 48 received in the three-sided enclosure of heat exchanger 50. The battery pack 48 comprises a plurality of battery cells 1, each of the battery cells 1 having an outer shell in the shape of a rectangular prism. The battery cells 1 are arranged side-by-side inside the three-sided enclosure. Each battery cell 1 has three of its through-plane faces 4, 5, 6 in contact with the respective panels 60, 58, 56 of heat exchanger 50, such that the heat exchanger 50 removes heat from the battery cells 1 along three of their through-plane faces 4, 5 and 6.

Heat exchanger 50 further comprises a pressurizing element in the form of a tensioning band 84 which applies an inwardly directed pressure on the first panel 56 and the third panel 60, thereby bringing them into intimate engagement with the respective through-plane faces 6, 4 of the battery cells 1 of battery pack 48. The tensioning band 84 extends completely around the three-sided enclosure. However, it will be appreciated that other types of arrangements can be used for ensuring intimate engagement between the heat exchanger 50 and the battery pack 48.

Figure 10:
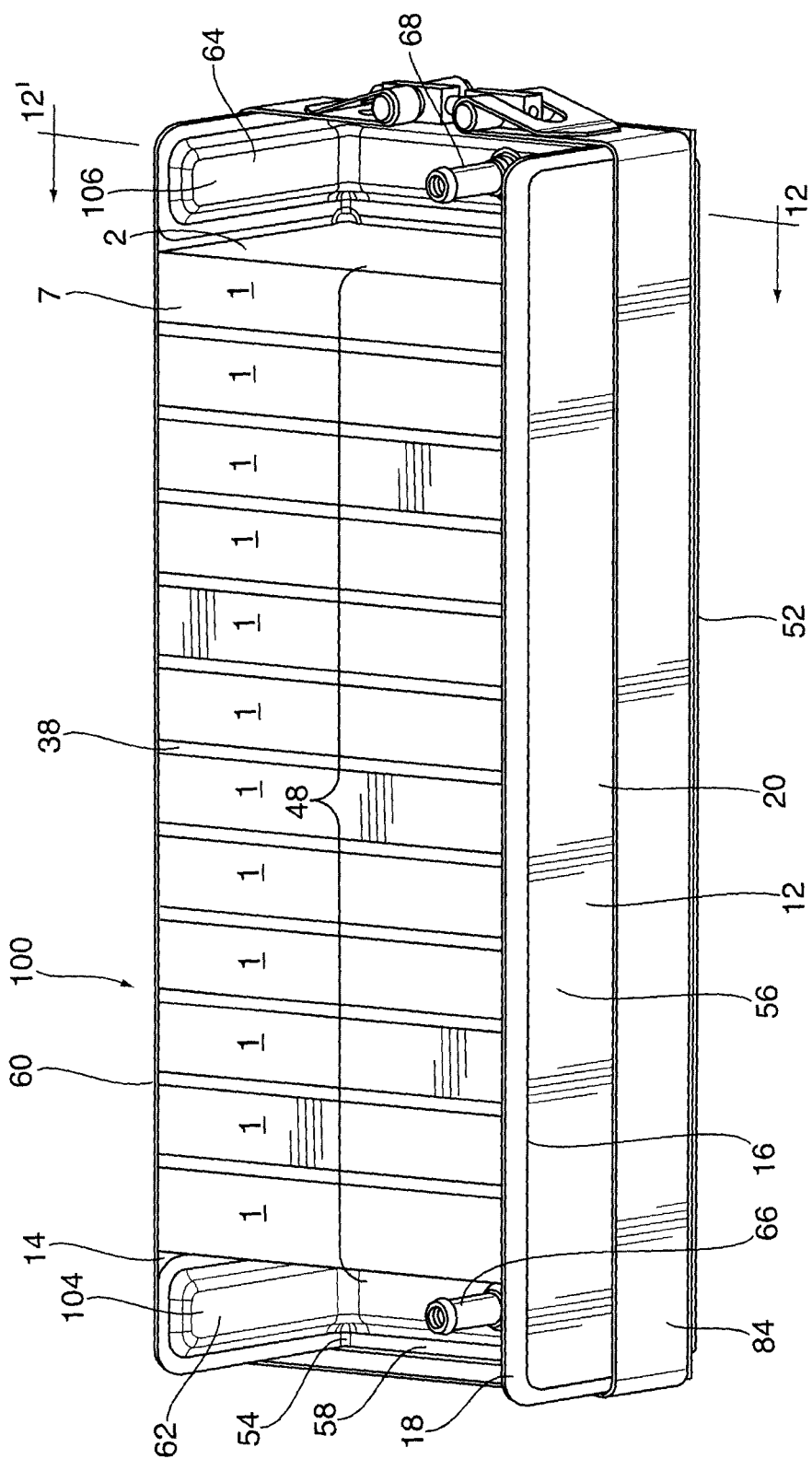
FIG. 10 is a top perspective view of a heat exchanger according to a second embodiment.
Figure 11:
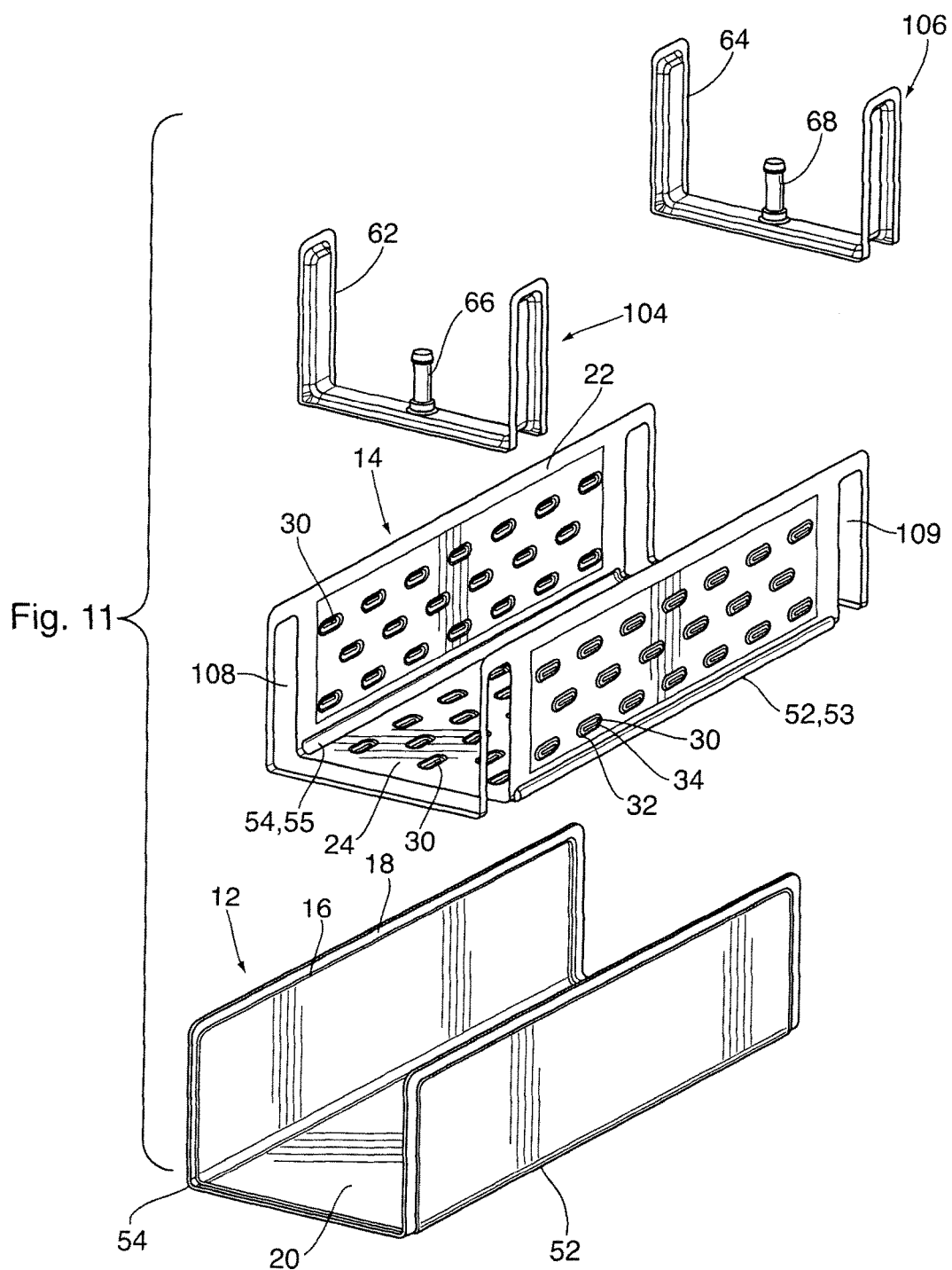
FIG. 11 is an exploded perspective view of the heat exchanger of FIG. 10.
Figure 12:
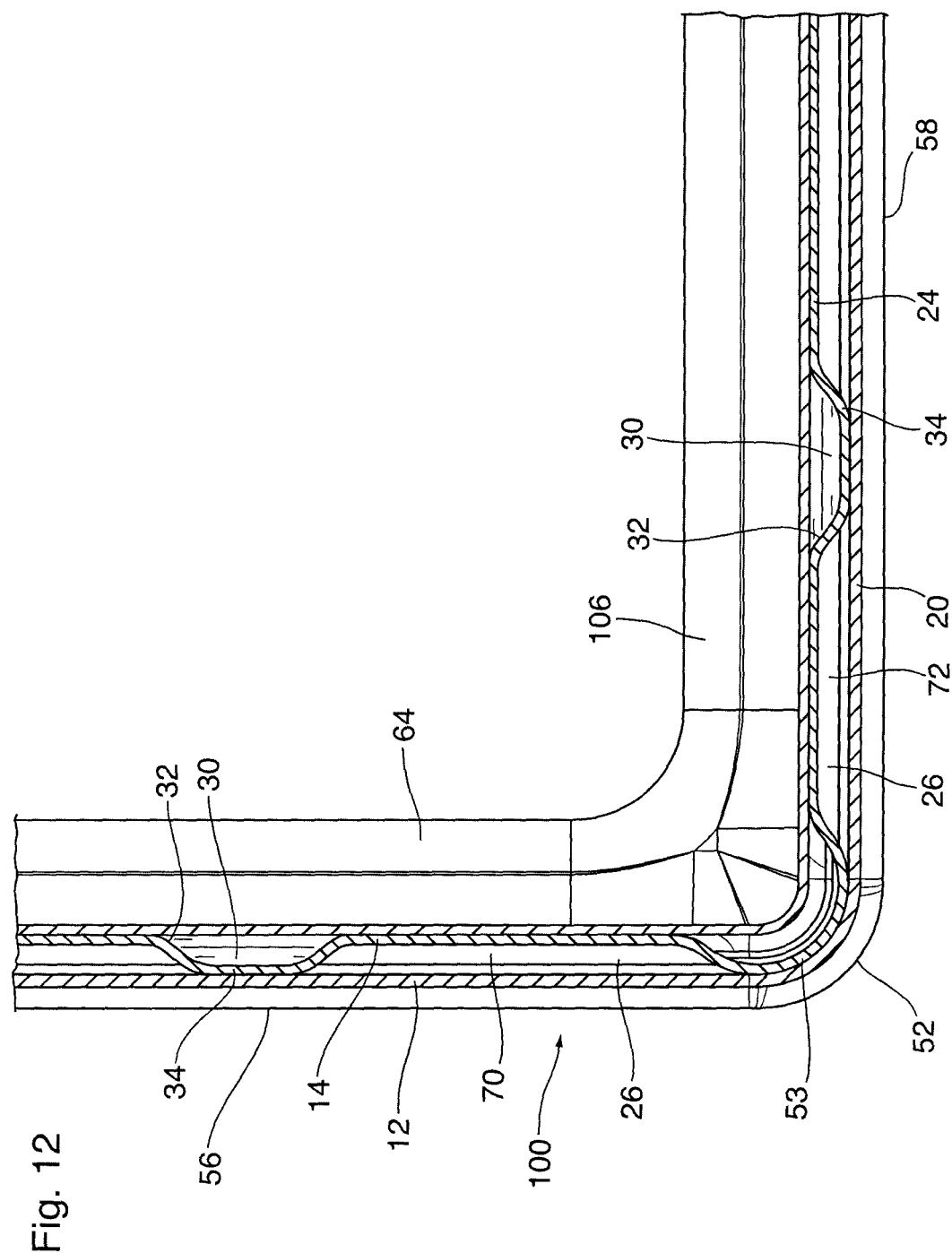
FIG. 12 is a partial cross-section along line 12-12' of FIG. 10.

A heat exchanger 100 according to a second embodiment is now described with reference to FIGS. 10 to 12. Heat exchanger 100 shares a number of elements in common with heat exchanger 50. Like reference numerals are used to refer to like elements in the following description and in the drawings, and the above description of these elements in connection with heat exchanger 50 also applies to heat exchanger 100.

Heat exchanger 100 includes two linear bends 52, 54 so as to define an open-ended three sided enclosure comprising three fluid-carrying panels 56, 58, 60. As in heat exchanger 50, the inwardly facing sides of the fluid-carrying panels are defined by the second plate 14 and the outwardly facing sides are defined by the first plate 12.

The main difference between the heat exchangers 50 and 100 is that heat exchanger 100 has its first and second manifolds 62, 64 defined on the inside of the three-sided enclosure, such that the first and second manifolds 62, 64 are formed on the second plate 14 rather than on the first plate 12. The locations of first and second manifolds 62, 64 are typically determined by packaging considerations, and it will be appreciated that heat exchanger 100 is functionally similar to heat exchanger 50. As in heat exchanger 50, the first and second manifolds 62, 64 comprise inlet and outlet manifolds, respectively.

In heat exchanger 100, the first and second manifolds 62, 64 may be stamped into the second plate 14 as in heat exchanger 50. However, in the illustrated embodiment, the first and second manifolds 62, 64 are formed by attaching separately formed three-sided raised bubbles 104, 106 over respective transverse openings 108, 109 formed at the ends of the second plate 14. The three-sided raised bubbles 104, 106 have flanges for attachment to the second plate 14, for example by brazing or welding, and may be thicker than the second plate 14.

By simultaneously cooling a plurality of the through-plane faces, the inventors have found that multi-panel heat exchangers 50 and 100 provide improved cooling and temperature uniformity over single panel heat exchangers in contact with one of the in-plane faces. In addition, the provision of the inner plate 14 of thinner, deformable material provides improved heat transfer and/or cost savings due to the amounts and types of materials from which the inner plate 14 may be constructed.

Although not shown in the drawings, the heat exchangers 50, 100 may include features to retain the battery cells 1 inside the three-sided enclosure. For example, the first and third panels 56, 60 may include inwardly bendable tabs at their top edges, wherein inward bending of the tabs over the tops of the battery cells 1 keeps them in place within the enclosure.

Although heat exchangers 50 and 100 described above have three panels, it will be appreciated that heat exchangers according to other embodiments may comprise two panels, with a single 90 degree bend to provide a heat exchanger having an overall L-shape, so as to cool two of the four through-plane faces of the battery cells 1.

Figure 13:
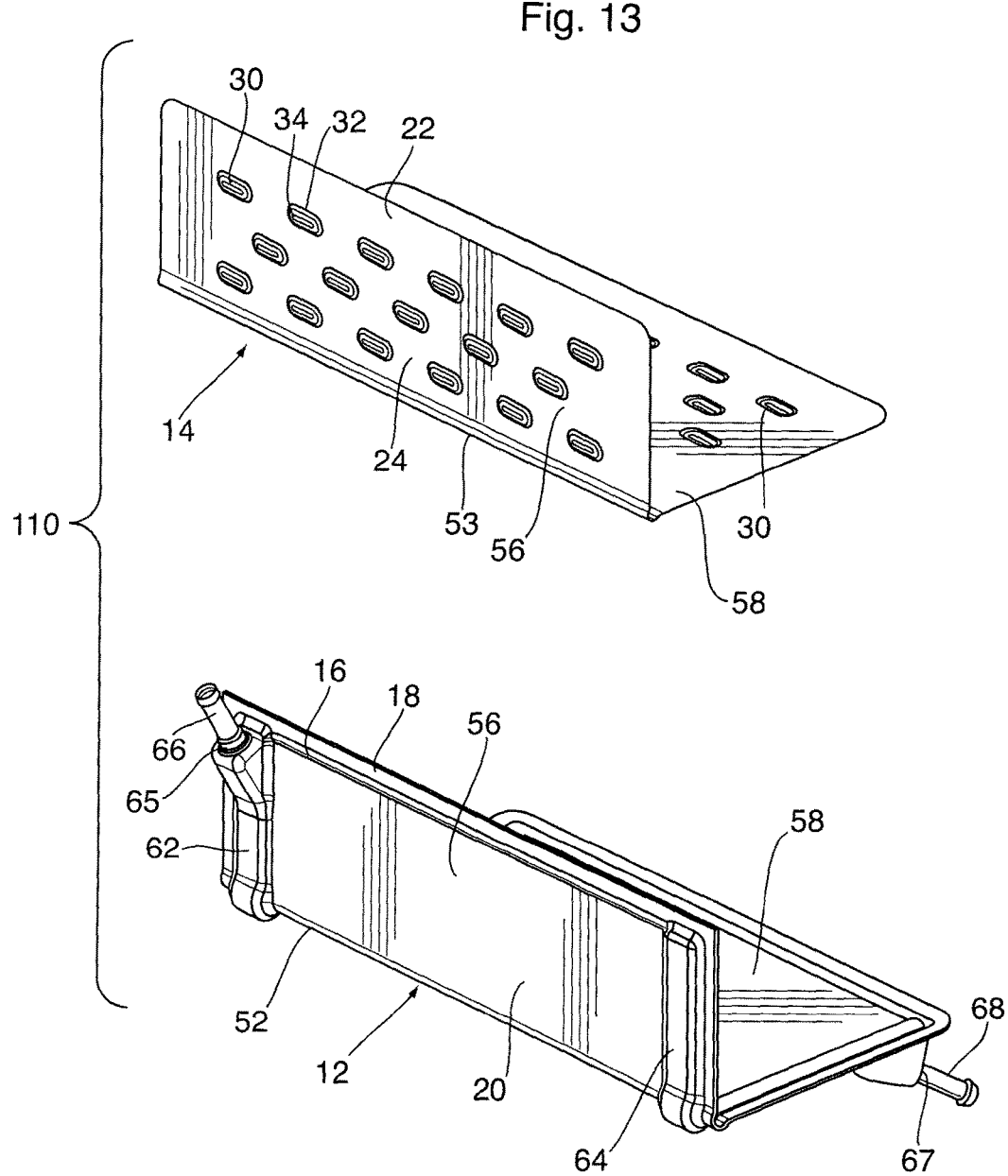
FIG. 13 is an exploded perspective view of a two-panel heat exchanger according to a third embodiment.

An exploded view of an L-shaped heat exchanger 110 comprising two panels is shown in FIG. 13. Heat exchanger 110 shares a number of elements in common with heat exchanger 50. Like reference numerals are used to refer to like elements in the following description and in the drawings, and the above description of these elements in connection with heat exchanger 50 also applies to heat exchanger 110.

Heat exchanger 110 comprises first and second plates 12, 14 which combine to form first and second fluid-carrying panels 56, 58 for cooling the respective through-plane faces 6,5 or 5,4 of the battery cells 1 making up a battery pack 48 (not shown), having the same configuration as the battery cells 1 and battery packs 48 described above. The first and second fluid-carrying panels 56, 58 are separated by a linear bend 52 formed in the first plate 12 and a corresponding rib 53 formed in the second plate, both extending parallel to the through-plane faces of the battery cells 1. The bend 52 forms an angle of about 90°.

Each fluid-carrying panel 56, 58 has an inwardly facing side and an outwardly facing side, and is constructed from two multi-faceted plates 12, 14, with the outwardly facing sides of panels 56, 58 being formed by relatively thick first plate 12, and the inwardly facing sides of panels 56, 58 being formed by relatively thin second plate 14. The first plate 12 has an outer peripheral edge 16 surrounding a central fluid flow area 20, and with a peripheral sealing flange 18 through which the first plate 12 is joined to the second plate 14. The second plate 14 has an outer peripheral edge 22 surrounding a central fluid flow area 24. The first and second plates 12, 14 are sealingly joined together along their outer peripheral edges 16, 22 to define a fluid flow passageway 26, not shown in FIG. 13.

The heat exchanger 110 also includes an inlet opening 65 and inlet fitting 66, an outlet opening 67 and outlet fitting 68, a first manifold 62 and a second manifold 64, located at opposite ends of the thicker first plate 12. As in the above-described embodiments, the first and second manifolds 62, 64 of heat exchanger 110 are the inlet and outlet manifolds, respectively. A plurality of support elements 30 are provided in the second plate 14, the support elements 30 comprising a plurality of protrusions in the form of intermittently spaced ribs or dimples. An outwardly extending elongate rib 53 may be provided in the second plate 14 in the area of bend 52 to separate the fluid flow passageway into two separate channels.

In the embodiments described above, the fluid flow passageway 26 of the heat exchanger is divided into first and second flow channels 70, 72 in the case of the two-panel heat exchanger 110. In the case of the three-panel heat exchangers 50, 100, the fluid flow passageway is divided into first, second and third flow channels 70, 72, 74. The heat exchangers 50, 100, 110 described above are "single-pass" heat exchangers, in which the flow of fluid through fluid flow passageway 26 and the flow channels 70, 72 and 74 (where applicable) is unidirectional, from the first manifold 62 to the second manifold 64.

Therefore, in the above-described three-panel heat exchangers 50, 100, the first manifold 62 consists of an inlet manifold space which is in flow communication with the first, second and third flow channels 70, 72, 74, in which the inlet opening 65 is provided. Similarly, the second manifold 64 consists of an outlet manifold space which is in flow communication with the first, second and third flow channels 70, 72, 74, in which the outlet opening 67 is provided.

In the above-described two-panel heat exchanger 110, the first manifold 62 consists of an inlet manifold space which is in flow communication with the first and second flow channels 70,72, in which the inlet opening 65 is provided. Similarly, the second manifold 64 consists of an outlet manifold space which is in flow communication with the first and second flow channels 70, 72, in which the outlet opening 67 is provided.

Figure 14:
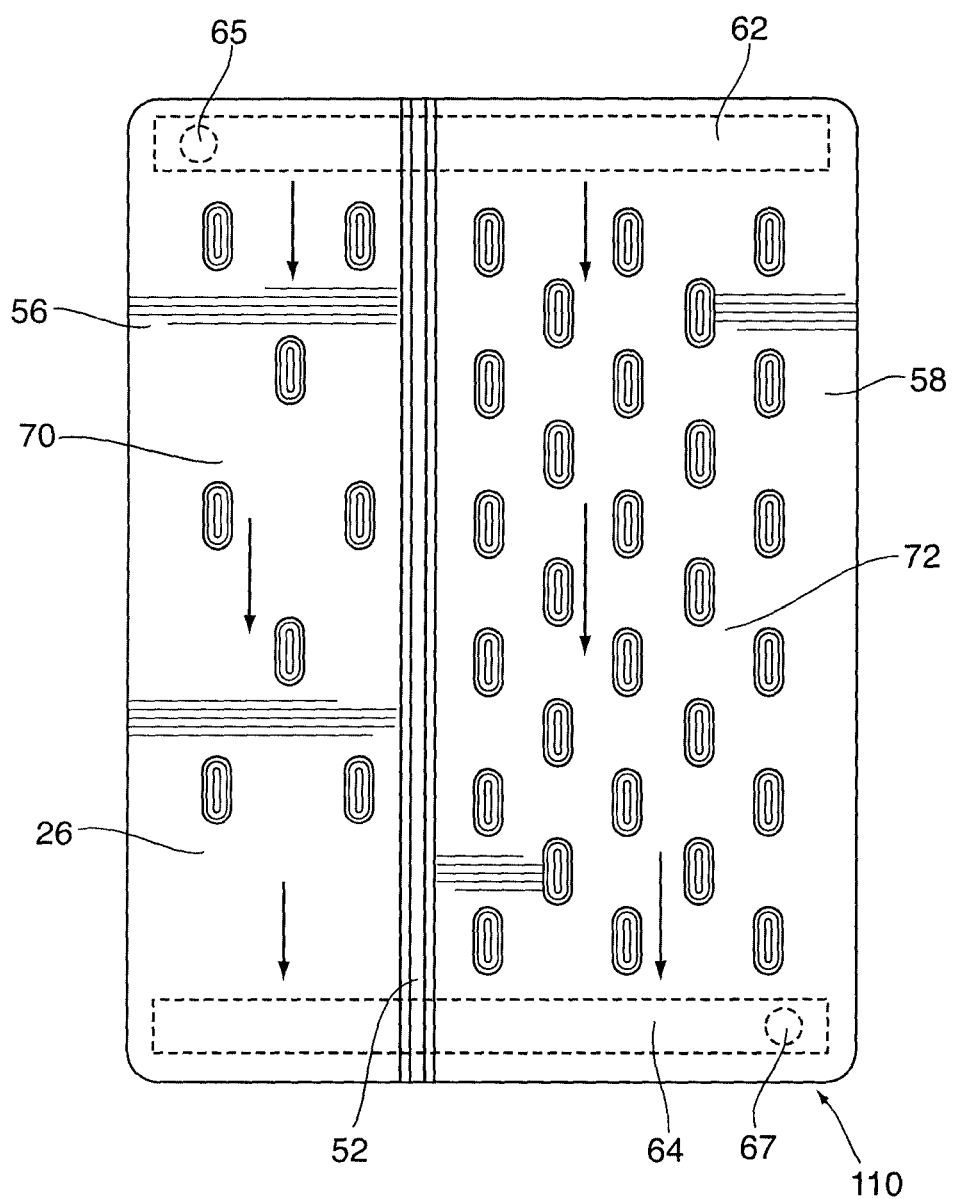
FIG. 14 is a schematic plan view showing the two-panel heat exchanger of FIG. 13 in flattened form.

FIG. 14 is a schematic plan view showing two-panel heat exchanger 110 in flattened form, showing the inwardly facing sides of fluid-carrying panels 56 and 58, with arrows showing the direction of flow through the flow channels 70, 72 from the first manifold 62 to the second manifold 64. As shown, the inlet opening 65 is located in the first manifold 62, and in the first fluid-carrying panel 56. The outlet opening 67 is located in the second manifold 64, and in the second fluid-carrying panel 58.

Figure 15:
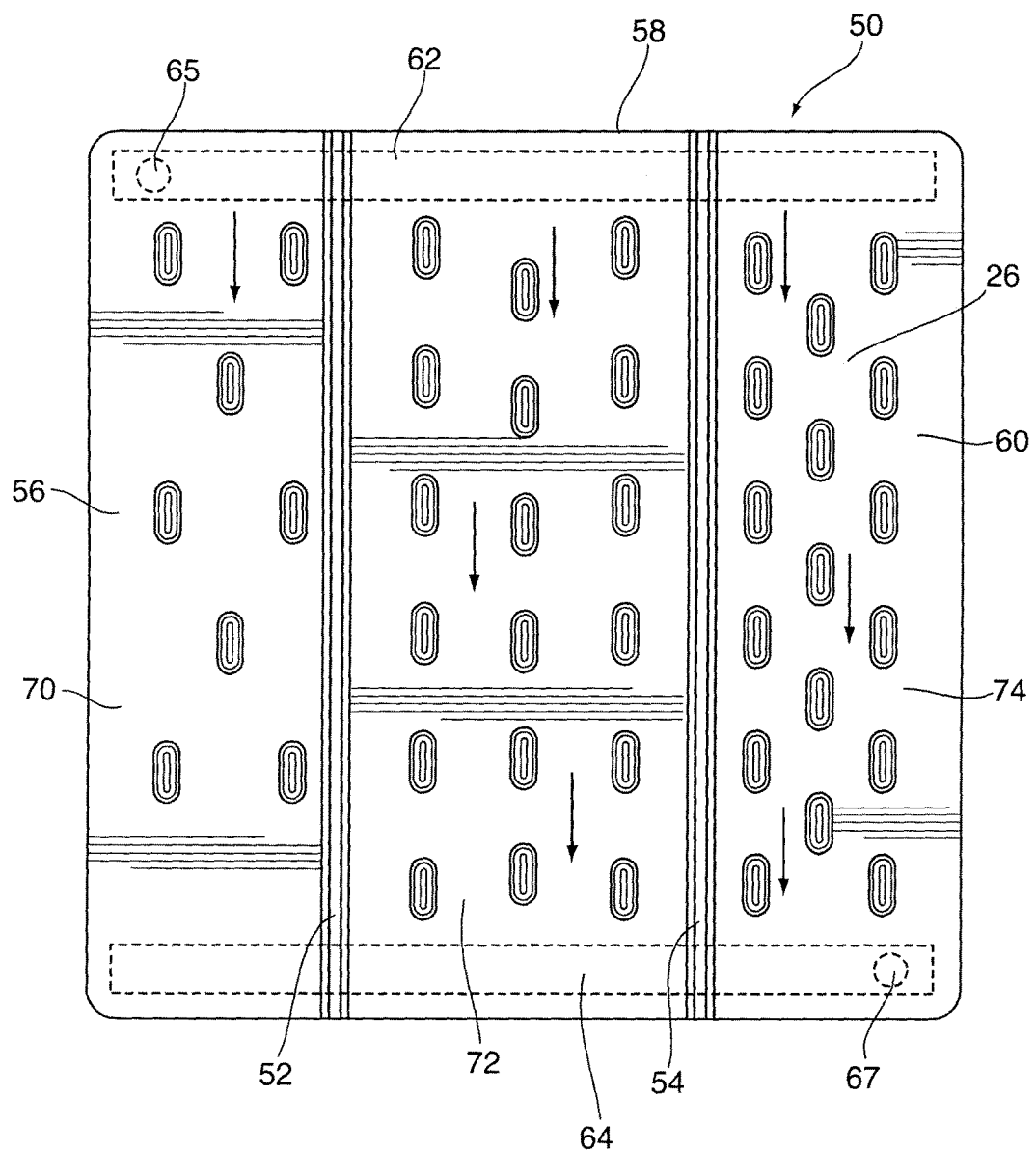
FIG. 15 is a schematic plan view showing the three-panel heat exchanger of FIG. 2 in flattened form.

FIG. 15 is a schematic plan view showing three-panel heat exchanger 50 in flattened form, showing the inwardly facing sides of fluid-carrying panels 56, 58 and 60, with arrows showing the direction of flow through the flow channels 70, 72, 74. As mentioned above, heat exchanger 50 has a single-pass configuration, with unidirectional fluid flow from the first manifold 62 to the second manifold 64. The appearance of heat exchanger 100 would be substantially the same as the appearance of heat exchanger 50 shown in FIG. 15. In this embodiment, each manifold 62, 64 is in flow communication with all of the flow channels 70, 72, 74, with the inlet opening 65 located in the first manifold 62 and in the first fluid-carrying panel 56, and the outlet opening 67 located in the second manifold 64 and the third fluid-carrying panel 60.

Figure 16:
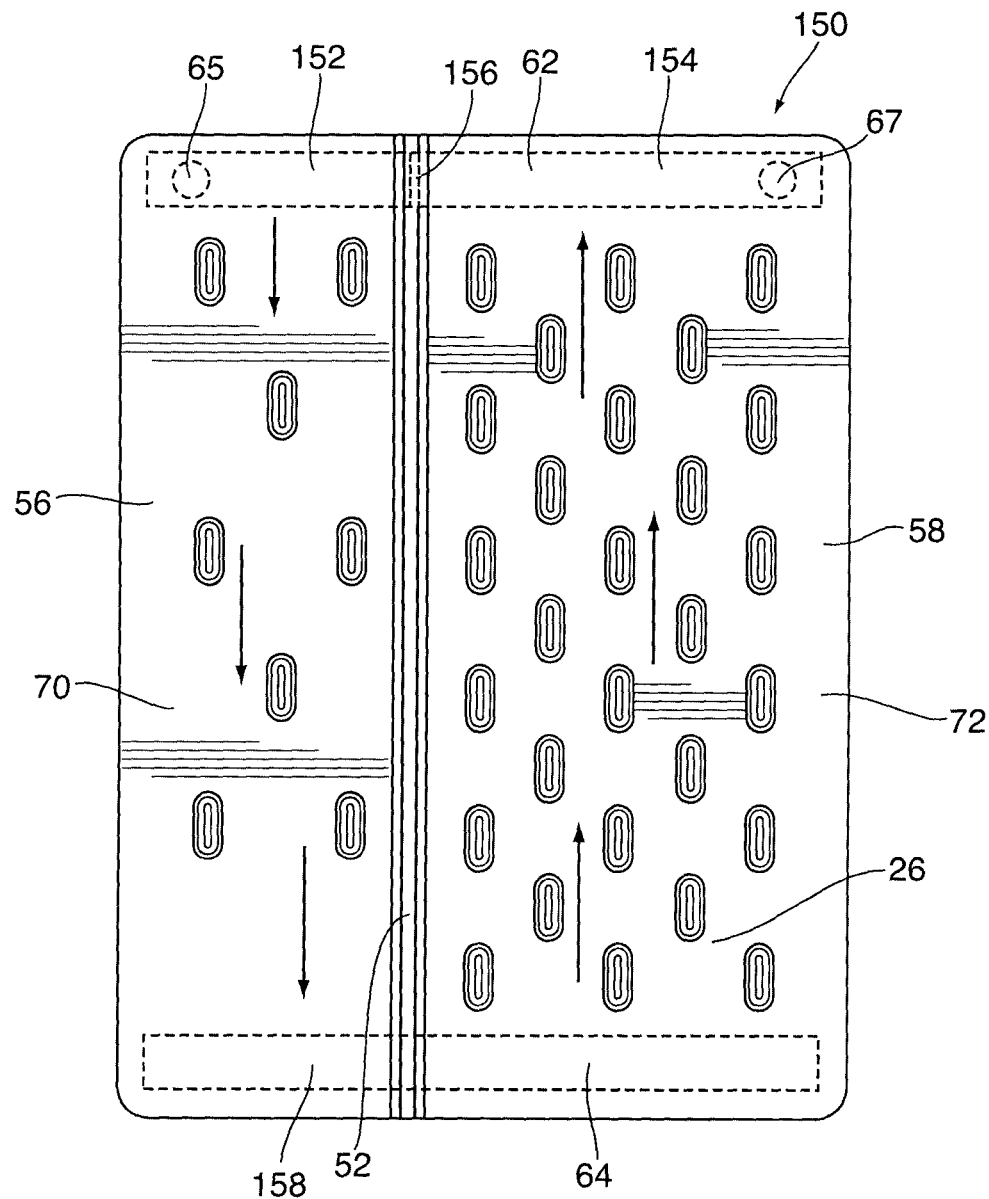
FIG. 16 is a schematic plan view showing a two-panel, two-pass heat exchanger in flattened form.

FIG. 16 is a schematic plan view showing a two-panel heat exchanger 150 in flattened form, showing the inwardly facing sides of fluid-carrying panels 56 and 58, with arrows showing the direction of flow through the flow channels 70, 72. Heat exchanger 150 is identical to heat exchanger 110 described above, except as otherwise noted below.

The two-panel heat exchanger 150 of FIG. 16 is an example of a two-pass heat exchanger, wherein the fluid undergoes one change in direction as it flows through the fluid flow passageway 26. Therefore, in the present embodiment, the first manifold 62 consists of an inlet manifold space 152 in flow communication with the first flow channel 70, and an outlet manifold space 154 in flow communication with the second flow channel 72. The inlet opening 65 is provided in the inlet manifold space 152, which is located in the first fluid-carrying panel 56, and the outlet opening 67 is provided in the outlet manifold space 154, which is located in the second fluid-carrying panel 58. Therefore, in this embodiment, the inlet and outlet openings 65, 67 for the fluid are both provided in the first manifold 62, and are located at the same end of the heat exchanger 150. The inlet and outlet manifold spaces 152, 154 are sealed from one another. For example, the first manifold 62 may be provided with an internal barrier 156 to seal the inlet and outlet manifold spaces 152, 154 from each other, the barrier 156 being substantially co-linear with the linear bend 52. The internal barrier 156 may comprise a baffle located inside first manifold 62 or may be formed by crimping the first manifold 62 at the bend 52. Alternatively, the inlet and outlet manifold spaces 152, 154 may be separately formed in the first plate 12.

The second manifold 64 of heat exchanger 150 consists of a turnaround manifold space 158 in which the fluid changes direction from the first flow channel 70 to the second flow channel 72. The turnaround manifold space 158 is therefore in flow communication with the first and second flow channels 70, 72.

Figure 17:
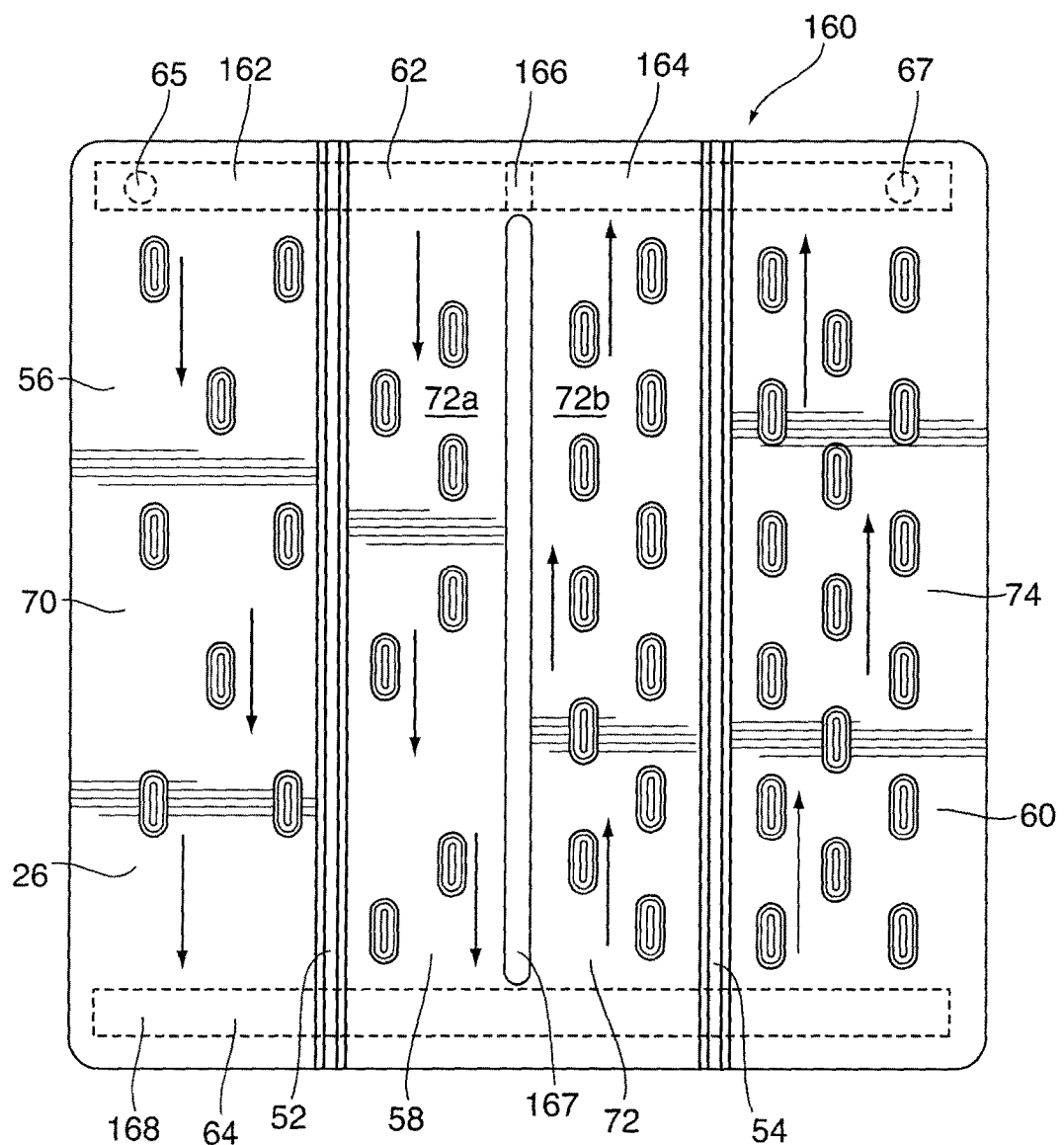
FIG. 17 is a schematic plan view showing a three-panel, two-pass heat exchanger in flattened form.

FIG. 17 is a schematic plan view showing a three-panel heat exchanger 160 in flattened form, showing the inwardly facing sides of fluid-carrying panels 56, 58 and 60, with arrows showing the direction of flow through the flow channels 70, 72, 74. Heat exchanger 160 is identical to three-panel heat exchangers 50, 100 described above, except as otherwise noted below.

The three-panel heat exchanger 160 of FIG. 17 is an example of a two-pass heat exchanger, wherein the fluid undergoes one change in direction as it flows through the fluid flow passageway 26. Therefore, in the present embodiment, the first manifold 62 consists of an inlet manifold space 162 in flow communication with the first flow channel 70 and a first portion 72a of the second flow channel 72 proximate to the first flow channel 70; and an outlet manifold space 164 in flow communication with the third flow channel 74 and a second portion 72b of the second flow channel 72. The inlet opening 65 is provided in the inlet manifold space 162, specifically in the first fluid-carrying panel 56, and the outlet opening 67 is provided in the outlet manifold space 164, specifically in the third fluid-carrying panel 60. Therefore, in this embodiment, the inlet and outlet openings 65, 67 for the fluid are both provided in the first manifold 62, and are located at the same end of the heat exchanger 160. The inlet and outlet manifold spaces 162, 164 are sealed from one another. For example, the first manifold 62 may be provided with an internal barrier 166 to seal the inlet and outlet manifold spaces 162, 164 from each other. The internal barrier 166 may comprise a baffle or may be formed by crimping the first manifold 62. Alternatively, the inlet and outlet manifold spaces 162, 164 may be separately formed in the first plate 12.

The first and second portions 72a, 72b of the second flow channel are separated from one another by an elongate flow barrier 167 extending between the first and second manifolds 62, 64. As shown, the flow barrier 167 is substantially co-linear with the internal barrier 166 separating the inlet and outlet manifold spaces 162, 164 of the first manifold 62. The flow barrier 167 may comprise a rib formed in the first plate 12 and/or second plate 14, wherein the first and second plates 12, 14 are in sealed contact with one another along the length of the flow barrier 167. It is to be noted that there is no bend in the second fluid-carrying panel 58 along flow barrier 167. Rather, the flow barrier 167 in the present embodiment is located approximately along the centre of the second fluid-carrying panel 58.

The second manifold 64 of heat exchanger 160 consists of a turnaround manifold space 168 in which the fluid changes direction from flow channels 70, 72a to flow channels 72b, 74. The turnaround manifold space 168 is therefore in flow communication with the first and second flow channels 70, 72.

Figure 18:
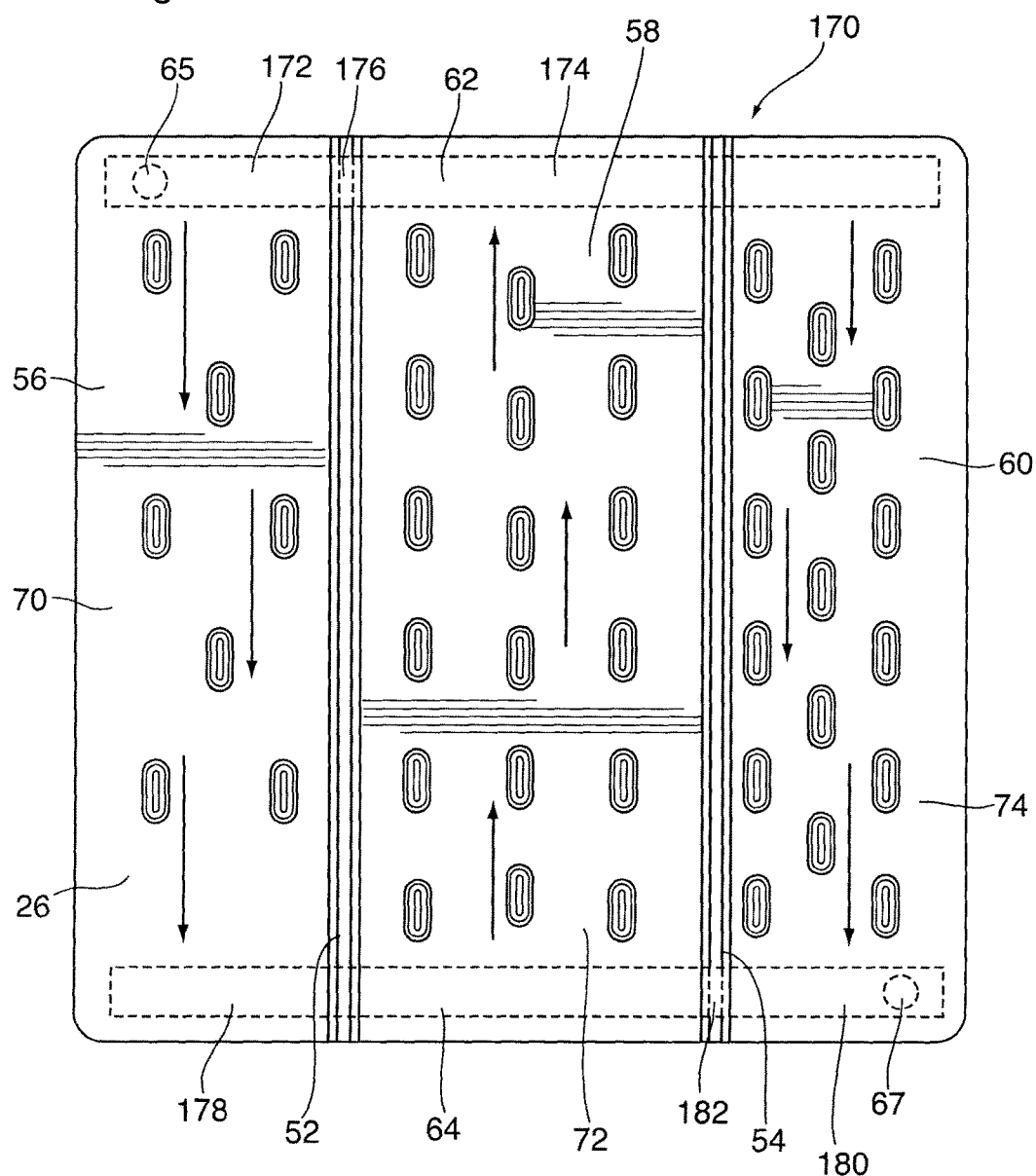
FIG. 18 is a schematic plan view showing a three-panel, three-pass heat exchanger in flattened form.

FIG. 18 is a schematic plan view showing a three-panel heat exchanger 170 in flattened form, showing the inwardly facing sides of fluid-carrying panels 56, 58 and 60, with arrows showing the direction of flow through the flow channels 70, 72, 74. Heat exchanger 170 is identical to three-panel heat exchangers 50, 100 described above, except as otherwise noted below.

The three-panel heat exchanger of FIG. 18 is an example of a three-pass heat exchanger, wherein the fluid undergoes two changes in direction as it flows through the fluid flow passageway 26. Therefore, in the present embodiment, the first manifold 62 consists of an inlet manifold space 172 in flow communication with the first flow channel 70 and turnaround manifold space 174 in flow communication with the second and third flow channels 72, 74, wherein the inlet opening 65 is provided in the inlet manifold space 172. The first manifold 62 is provided with an internal barrier 176 to seal the inlet manifold space 172 from the turnaround manifold space 174 of first manifold 62. The internal barrier 176 may be substantially co-linear with the linear bend 52 between the fluid-carrying panels 56, 58. Alternatively, the inlet and turnaround manifold spaces 172, 174 may be separately formed in the first plate 12.

The second manifold 64 consists of a turnaround manifold space 178 in flow communication with the first and second flow channels 70, 72, and an outlet manifold space 180 in flow communication with the third flow channel 74, wherein the outlet opening 67 is provided in the outlet manifold space 180. The second manifold 64 may be provided with an internal barrier 182 to seal the turnaround manifold space 178 from the outlet manifold space 180 of second manifold 64. The internal barrier 182 may be substantially co-linear with the linear bend 54 between the fluid-carrying panels 58, 60. Alternatively, the turnaround and outlet manifold spaces 178, 180 may be separately formed in the first plate 12.

Therefore, in this embodiment, the inlet and outlet openings 65, 67 for the fluid are provided in the respective first and second manifolds 62, 64, and are located at opposite ends of the heat exchanger 170.

In the heat exchangers 50, 100 and 110 described above, the support elements 30 are in the form of ribs or dimples which are of substantially the same size and shape, which are substantially uniformly spaced across each of the flat surfaces (facets) of the first and/or second plates 12, 14, and with substantially the same pattern of support elements 30 being provided in all the flat surfaces making up the first and/or second plates 12, 14. Therefore, in these embodiments, each of the panels 56, 58, 60 making up the heat exchanger 50, 100 or 110 will have a substantially uniform pattern of support elements 30, and substantially the same pattern will be present in each of the panels 56, 58, 60.

In some embodiments, it may be desirable to vary the size, shape and/or pattern of the support elements 30 within each of the flat surfaces making up the second plate 14, and/or to provide the flat surfaces with support elements 30 which differ from one another in terms of size, shape and/or pattern. This variation in the support elements 30 may achieve improved temperature uniformity in the heat exchanger and/or in the battery cells 1, and is discussed below with reference to FIGS. 14 to 18.

The variation in the size, shape and/or pattern of the support elements 30 produces variations in the proportion of the total surface area of the flow channels 70, 72, 74 which are occupied by the support elements 30, thereby producing variations in the areas of the flow channels 70, 72, 74 relative to one another. In some embodiments, the variations in the proportion of the total surface area occupied by the support elements 30 is accomplished by varying the pattern and/or spacing of the support elements 30 on the first and/or second plate 14, thereby varying the density of the support elements 30 in the flow channels. It will be appreciated that the maximum spacing between the support elements 30 (i.e. minimum density of elements 30) is that which will provide adequate support for the first and second plates 12, 14, so as to maintain adequate spacing between plates 12, 14.

In the two-panel, one-pass heat exchanger 110 of FIG. 14, the inlet opening 65 is provided in a portion of the first manifold 62 located in the first fluid-carrying panel 56, which defines the first flow channel 70. The outlet opening 67 is provided in a portion of the second manifold 64 located in the second fluid-carrying panel 58, which defines the second flow channel 72. In this embodiment, a proportion of the total surface area of the first flow channel 70 occupied by the support elements 30 is less than a proportion of the total surface area of the second flow channel 72 occupied by the support elements 30. For example, the density of the support elements 30 in the second flow channel 72 may be greater than the density of the support elements 30 in the first flow channel 70, thereby producing graded heat transfer surfaces in the flow channels 70, 72. In an embodiment, the density of support elements 30 in the first flow channel 70 may be a minimum density (D) required to support and maintain the second plate 14 in spaced relation to the first plate 12, and the density of support elements 30 in the second flow channel 72 may be about twice the minimum density (i.e. 2×D).

In the three-panel, one-pass heat exchanger 50 of FIG. 15, the inlet opening 65 is provided in a portion of the first manifold 62 located in the first fluid-carrying panel 56, which defines the first flow channel 70. The outlet opening 67 is provided in a portion of the second manifold 64 located in the third fluid-carrying panel 60, which defines the third flow channel 74. In this embodiment, the proportion of the total surface area of the first flow channel 70 occupied by the support elements 30 is less than a proportion of the total surface area of the second flow channel 72 occupied by the support elements 30, which is less than a proportion of the total surface area of the third flow channel 74 occupied by the support elements 30. For example, the density of the support elements 30 in the second flow channel 72 may be greater than the density of the support elements 30 in the first flow channel 70, and the density of the support elements 30 in the third flow channel 74 may be greater than the density of the support elements 30 in the second flow channel 72, thereby producing graded heat transfer surfaces in the flow channels 70, 72, 74. In an embodiment, the density of support elements 30 in the first flow channel 70 may be a minimum density (D) required to support and maintain the second plate 14 in spaced relation to the first plate 12, the density of support elements 30 in the second flow channel 72 may be about one and a half times the minimum density (i.e. 1.5×D), and the density of support elements 30 in the third flow channel 74 may be about twice the minimum density (i.e. 2×D).

In the two-panel, two-pass heat exchanger 150 of FIG. 16, the proportion of the total surface area of the first flow channel 70 occupied by the support elements 30 is less than a proportion of the total surface area of the second flow channel 72 occupied by the support elements 30. For example, the density of the support elements 30 in the second flow channel 72 may be greater than the density of the support elements 30 in the first flow channel 70, thereby producing graded heat transfer surfaces in the flow channels 70, 72, increasing in density from the inlet opening 65 to the outlet opening 67. In an embodiment, the density of support elements 30 in the first flow channel 70 may be a minimum density (D) required to support and maintain the second plate 14 in spaced relation to the first plate 12, and the density of support elements 30 in the second flow channel 72 may be about twice the minimum density (i.e. 2×D).

In the three-panel, two-pass heat exchanger 160 of FIG. 17, the proportion of the total surface area of the first flow channel 70 and the first portion 72a of the second flow channel 72 occupied by the support elements 30 is less than a proportion of the total surface area of the second portion 72b of the second flow channel 72 and the third flow channel 74 occupied by the support elements 30, which is less than a proportion of the total surface area of the third flow channel 74 occupied by the support elements 30. For example, the density of the support elements 30 in the second portion 72b of the second flow channel 72 and the third flow channel 74 may be greater than the density of the support elements 30 in the first flow channel 70 and the first portion 72a of the second flow channel 72, thereby producing graded heat transfer surfaces in the flow channels 70, 72, 74. In an embodiment, the density of support elements 30 in the first flow channel 70 and the first portion 72a of the second flow channel 72 may be a minimum density (D) required to support and maintain the second plate 14 in spaced relation to the first plate 12, and the density of support elements 30 in the second portion 72b of the second flow channel 72 may be about twice the minimum density (i.e. 2×D).

In the three-panel, three-pass heat exchanger 170 of FIG. 18, the proportion of the total surface area of the first flow channel 70 occupied by the support elements 30 is less than a proportion of the total surface area of the second flow channel 72 occupied by the support elements 30, which is less than a proportion of the total surface area of the third flow channel 74 occupied by the support elements 30. For example, the density of the support elements 30 in the second flow channel 72 may be greater than the density of the support elements 30 in the first flow channel 70, and the density of the support elements 30 in the third flow channel 74 may be greater than the density of the support elements 30 in the second flow channel 72, thereby producing graded heat transfer surfaces in the flow channels 70, 72, 74. In an embodiment, the density of support elements 30 in the first flow channel 70 may be a minimum density (D) required to support and maintain the second plate 14 in spaced relation to the first plate 12, the density of support elements 30 in the second flow channel 72 may be about one and a half times the minimum density (i.e. 1.5×D), and the density of support elements 30 in the third flow channel 74 may be about twice the minimum density (i.e. 2×D).

It will be appreciated that the specific spacing of support elements 30 illustrated in FIGS. 14 to 18 are for purposes of illustration only, and can be varied in numerous different ways. The provision of graded heat transfer surfaces as discussed above, by varying the size, shape, pattern and/or spacing of the support elements 30, provides improved surface temperature uniformity by increasing the surface area of the heat transfer surfaces in fluid flow passageway 26 between the inlet opening 65 and the outlet opening 67. For example, increasing the proportion of the total surface area of a flow channel 70, 72 or 74 occupied by the support elements 30 brings about a corresponding increase in the surface area of the heat transfer surfaces in that flow channel 70, 72 or 74.

Although the multi-panel heat exchangers 50, 100 and 110 described above include three panels 56, 58, 60 constructed from a single pair of first and second plates 12, 14, it will be appreciated that each panel 56, 58, 60 may comprise separately formed pairs of first and/or second plates 12, 14.

Although the invention has been described in connection with certain embodiments, it is not limited thereto. Rather, the invention includes all embodiments which may fall within the scope of the following claims.

What is claimed is:

1. A heat exchanger for a battery, the heat exchanger having a length and a width, comprising a plurality of fluid-carrying panels and defining a multi-sided enclosure for enclosing at least two sides of the battery, the heat exchanger comprising:
(a) a first fluid-carrying panel defining a first flow channel for flow of a fluid, the first flow channel extending along the length of the heat exchanger, the first fluid-carrying panel having a length and a width;
(b) a second fluid-carrying panel defining a second flow channel for flow of said fluid, the second flow channel extending along the length of the heat exchanger, the second fluid-carrying panel having a length and a width, wherein the first and second fluid-carrying panels are arranged at an angle to another;
(c) a first manifold extending transversely across the widths of the first and second flow channels;
(d) a second manifold extending transversely across the widths of the first and second flow channels;
(e) an inlet opening provided in one of said manifolds; and
(f) an outlet opening provided in one of said manifolds;
wherein the lengths of the first and second fluid-carrying panels are parallel to the length of the heat exchanger;
wherein each of the first manifold and the second manifold are adapted to distribute the fluid internally throughout the width of each of the first and second fluid-carrying panels.

2. The heat exchanger according to claim 1, wherein the first and second manifolds are proximate to opposite ends of the heat exchanger.

3. The heat exchanger according to claim 1, wherein the first and second fluid-carrying panels are joined together along a first linear bend extending between the first and second manifolds; and
wherein the first and second flow channels are separated from one another by said first linear bend.

4. The heat exchanger according to claim 1, wherein each of the first and second manifolds extends substantially transversely to the first linear bend, and extends across a width of the first fluid-carrying panel and a width of the second fluid-carrying panel, such that each of the first and second manifolds is bent.

5. The heat exchanger according to claim 1, wherein the first and second fluid-carrying panels are arranged at an angle of about 90 degrees to one another, the heat exchanger having an L-shaped cross-section in a plane transverse to said first linear bend and defining a two-sided enclosure.

6. The heat exchanger according to claim 1, further comprising:
(g) a third fluid-carrying panel defining a third flow channel extending along the length of the heat exchanger, the third fluid-carrying panel having a length and a width, wherein the second and third fluid-carrying panels are arranged at an angle to one another;
wherein the first manifold extends transversely across the widths of the first, second and third flow channels; and
wherein the second manifold extends transversely across the widths of the first, second and third flow channels;
wherein the length of the third fluid-carrying panel is parallel to the length of the heat exchanger.

7. The heat exchanger according to claim 6, wherein the second and third fluid-carrying panels are joined together along a second linear bend extending between the first and second manifolds, wherein the first and second linear bends are parallel to one another; and
wherein the second and third flow channels are separated from one another by said second linear bend.

8. The heat exchanger according to claim 6, wherein each of the first and second manifolds extends substantially transversely to the first and second linear bends, and extends across a width of each of the first, second and third fluid-carrying panels, such that each of the first and second manifolds is bent.

9. The heat exchanger according to claim 6, wherein the first and second fluid-carrying panels are arranged at an angle of about 90 degrees to one another, and wherein the second and third fluid-carrying panels are arranged at an angle of about 90 degrees to one another, the heat exchanger having a U-shaped cross-section in a plane transverse to said linear bend, and defining an open-ended, three-sided enclosure in which the first and third fluid-carrying panels comprise opposed sides and the second panel comprises a base.

10. The heat exchanger according to claim 1, comprising:
   (i) a first plate having a first thickness, and having an outer peripheral edge surrounding a central fluid flow area; and
   (ii) a second plate having a second thickness, and having an outer peripheral edge surrounding a central fluid flow area, wherein the first and second plates are sealingly joined together along their outer peripheral edges and with the central fluid flow area of the first plate facing the central fluid flow area of the second plate, such that a fluid flow passageway is defined between the central fluid flow areas of the first and second plates and inside the outer peripheral edges of the first and second plates;
   wherein the fluid flow passageway comprises said flow channels; and
   wherein the second plate is compliant, such that the central fluid flow area of the second plate is deformable in a direction away from the central fluid flow area of the first plate in response to a pressure of a fluid inside the fluid flow passageway.

11. The heat exchanger according to claim 10, wherein the second thickness is less than the first thickness, and wherein the first plate is rigid.

12. The heat exchanger according to claim 11, wherein the first plate is compliant, such that the central fluid flow area of the second plate is deformable in a direction away from the central fluid flow area of the second plate in response to a pressure of a fluid inside the fluid flow passageway.

13. The heat exchanger according to claim 10, wherein at least one support element is provided in the fluid flow passageway, and extends between the first and second plates; and
   wherein the at least one support element is joined to one of the first and second plates.

14. The heat exchanger according to claim 13, wherein the heat exchanger comprises a plurality of said support elements, and wherein each of said support elements comprises a protrusion having a base which is joined to one of the first and second plates and a free end which is proximate to and/or in contact with the other of the first and second plates.

15. The heat exchanger according to claim 13, wherein the protrusions are in the form of ribs or dimples formed in the central fluid flow area of the first plate and/or the central fluid flow area of the second plate, or in the form of a turbulizer or corrugated fin.

16. The heat exchanger according to claim 10, wherein the first and second plates are comprised of aluminum or an aluminum alloy, and the outer peripheral edges of the first and second plates are sealingly joined together by brazing or welding.

17. The heat exchanger according to claim 10, wherein the second plate is comprised of a metallic or non-metallic material having lower thermal conductivity than aluminum; and
   wherein the non-metallic material is plastic.

18. The heat exchanger according to claim 10, wherein the heat exchanger includes said first and second linear bends to define said first, second and third fluid-carrying panels, wherein the first and second plates are in contact with one another along the first and second linear bends, between the manifolds, so as to divide the fluid flow passageway into three separate flow channels, each of which extends between the first and second manifolds.

19. A heat exchanger assembly comprising a heat exchanger according to claim 1, and further comprising one or more heat-generating elements, each of which is received inside said multi-sided enclosure;
   wherein the one or more heat generating elements comprises a plurality of prismatic battery cells together comprising a battery pack, wherein each of the prismatic battery cells comprises a rectangular prism having two in-plane faces and four through-plane faces, wherein the through-plane faces are parallel to the first linear bend and perpendicular to the in-plane faces, and wherein each of the fluid-carrying panels is in contact with and/or in close proximity to one of the through-plane faces of each of said battery cells.

20. The heat exchanger of claim 19, comprising a first plate having a first thickness, and a second plate having a second thickness, the first and second plates each having an outer peripheral edge surrounding a central fluid flow area, wherein the first and second plates are sealingly joined together along their outer peripheral edges and with the central fluid flow area of the first plate facing the central fluid flow area of the second plate, such that a fluid flow passageway is defined between the central fluid flow areas of the first and second plates and inside the outer peripheral edges of the first and second plates;
   wherein the fluid flow passageway comprises said flow channels; and
   wherein the second plate is compliant, such that the central fluid flow area of the second plate is deformable in a direction away from the central fluid flow area of the first plate in response to a pressure of a fluid inside the fluid flow passageway; and
   wherein the prismatic battery cells have rounded corners, such that gaps exist between the rounded corners of the prismatic battery cells and the second plate of the heat exchanger.

21. The heat exchanger according to claim 1,
   wherein the first manifold consists of an inlet manifold space in flow communication with the first and second flow channels;
   wherein the inlet opening is provided in the first manifold;
   wherein the second manifold consists of an outlet manifold space in flow communication with the first and second flow channels; and
   wherein the outlet opening is provided in the second manifold;
   wherein the heat exchanger includes a plurality of support elements in the fluid flow passageway, and wherein each of said support elements comprises a rib or a dimple having a base which is joined to one of the first and second plates and a free end which is proximate to and/or in contact with the other of the first and second plates;
   wherein the inlet opening is provided in a portion of the first manifold located in the first fluid-carrying panel;
   wherein the outlet opening is provided in a portion of the second manifold located in the second fluid-carrying panel; and
   wherein a proportion of a total surface area of the first flow channel occupied by the support elements is less than a proportion of a total surface area of the second flow channel occupied by the support elements.

22. The heat exchanger according to claim 6,
   wherein the first manifold consists of an inlet manifold space in flow communication with the first, second and third flow channels;

wherein the inlet opening is provided in the first manifold;
wherein the second manifold consists of an outlet manifold space in flow communication with the first, second and third flow channels; and
wherein the outlet opening is provided in the second manifold;
wherein the heat exchanger includes a plurality of support elements in the fluid flow passageway, and wherein each of said support elements comprises a rib or a dimple having a base which is joined to one of the first and second plates and a free end which is proximate to and/or in contact with the other of the first and second plates;
wherein the inlet opening is provided in a portion of the first manifold located in the first fluid-carrying panel;
wherein the outlet opening is provided in a portion of the second manifold located in the third fluid-carrying panel;
wherein a proportion of a total surface area of the first flow channel occupied by the support elements is less than a proportion of a total surface area of the second flow channel occupied by the support elements; and
wherein a proportion of a total surface area of the second flow channel occupied by the support elements is less than a proportion of a total surface area of the third flow channel occupied by the support elements.

23. The heat exchanger according to claim 1,
wherein the first manifold consists of an inlet manifold space in flow communication with the first flow channel, and an outlet manifold space in flow communication with the second flow channel;
wherein the inlet opening is provided in the inlet manifold space of the first manifold;
wherein the outlet opening is provided in the outlet manifold space of the first manifold; and
wherein the second manifold consists of a turnaround manifold space in flow communication with the first and second flow channels;
wherein the heat exchanger includes a plurality of support elements in the fluid flow passageway, and wherein each of said support elements comprises a rib or a dimple having a base which is joined to one of the first and second plates and a free end which is proximate to and/or in contact with the other of the first and second plates;
wherein a proportion of a total surface area of the first flow channel occupied by the support elements is less than a proportion of a total surface area of the second flow channel occupied by the support elements.

24. The heat exchanger according to claim 6,
wherein the first manifold consists of:
(a) an inlet manifold space in flow communication with the first flow channel and a first portion of the second flow channel proximate to the first flow channel; and
(b) an outlet manifold space in flow communication with the third flow channel and a second portion of the second flow channel proximate to the third flow channel;
wherein the inlet opening is provided in the inlet manifold space of the first manifold;
wherein the outlet opening is provided in the outlet manifold space of the first manifold;
wherein the first and second portions of the second flow channel are separated by an elongate flow barrier extending between the first and second manifolds;
wherein the second manifold consists of a turnaround manifold space in flow communication with the first, second and third flow channels;
wherein the heat exchanger includes a plurality of support elements in the fluid flow passageway, and wherein each of said support elements comprises a rib or a dimple having a base which is joined to one of the first and second plates and a free end which is proximate to and/or in contact with the other of the first and second plates;
wherein a proportion of a total surface area of the first flow channel and the first portion of the second flow channel occupied by the support elements is less than a proportion of a total surface area of the second portion of the second flow channel and the third flow channel occupied by the support elements.

25. The heat exchanger according to claim 6,
wherein the first manifold consists of an inlet manifold space in flow communication with the first flow channel, and a turnaround manifold space in flow communication with the second and third flow channels;
wherein the second manifold consists of a turnaround manifold space in flow communication with the first and second flow channels, and an outlet manifold space in flow communication with the third flow channel;
wherein the inlet opening is provided in the inlet manifold space of the first manifold; and
wherein the outlet opening is provided in the outlet manifold space of the second manifold;
wherein the heat exchanger includes a plurality of support elements in the fluid flow passageway, and wherein each of said support elements comprises a rib or a dimple having a base which is joined to one of the first and second plates and a free end which is proximate to and/or in contact with the other of the first and second plates;
wherein a proportion of a total surface area of the first flow channel occupied by the support elements is less than a proportion of a total surface area of the second flow channel occupied by the support elements; and
wherein a proportion of a total surface area of the second flow channel occupied by the support elements is less than a proportion of a total surface area of the third flow channel occupied by the support elements.

* * * * *